US012725180B2

(12) United States Patent
Piccoli et al.

(10) Patent No.: US 12,725,180 B2
(45) Date of Patent: Sep. 1, 2026

(54) INTELLIGENCE TOOL FOR VENDOR ENABLEMENT CAMPAIGNS

(71) Applicant: MASTERCARD INTERNATIONAL INCORPORATED, Purchase, NY (US)

(72) Inventors: Christopher Piccoli, Summit, NJ (US); Cynthia Phillips Meyer, Woodstock, IL (US); Marie Elizabeth Aloisi, Greenwich, CT (US); Raghuram Adiraju, Frisco, TX (US); Randhir Kumar, Samastipur (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/622,824

(22) Filed: Mar. 29, 2024

(65) Prior Publication Data

US 2024/0330978 A1 Oct. 3, 2024

(30) Foreign Application Priority Data

Mar. 31, 2023 (IN) ............................. 202311024803

(51) Int. Cl.
*G06Q 30/0242* (2023.01)

(52) U.S. Cl.
CPC ................................ *G06Q 30/0243* (2013.01)

(58) Field of Classification Search
CPC .................................................. G06Q 30/0243
See application file for complete search history.

(56) References Cited

U.S. PATENT DOCUMENTS 7,035,811 B2 * 4/2006 Gorenstein ........ G06Q 30/0277 705/7.33
9,984,386 B1 * 5/2018 Bhatia ................ G06Q 30/0241
11,176,607 B1 * 11/2021 Bekmann ............... G06Q 40/03
11,436,608 B1 * 9/2022 Mazzochi .............. G06Q 20/24
11,551,059 B1 * 1/2023 Yang .................... G06N 3/0464
(Continued)

OTHER PUBLICATIONS

Google Search for definition of hard and soft advertising message, date of search Dec. 19, 2024 (Year: 2024).*
(Continued)

*Primary Examiner* — Ilana L Spar
*Assistant Examiner* — Melinda Gieringer
(74) *Attorney, Agent, or Firm* — Barta Jones, PLLC

(57) ABSTRACT

A system includes a processor and a memory including computer program code. The memory and the computer program code are configured to, with the processor, cause the processor to: receive historical campaign data; determine a likelihood that a vendor will accept a card offer by inputting the historical campaign data into a machine learning model that has been trained for at least one campaign using training data comprising past campaign performance data; automatically recommend a campaign strategy tailored for the vendor using the machine learning model, wherein the recommended campaign strategy is an output of the machine learning model that is based on the determined likelihood that the vendor will accept the card offer; and automatically display the recommended campaign strategy output from the machine learning model on a graphical user interface (GUI).

20 Claims, 11 Drawing Sheets

(56) References Cited

U.S. PATENT DOCUMENTS

| | | | | |
|---|---|---|---|---|
| 11,886,465 | B1 * | 1/2024 | Waldmeier | G06F 16/335 |
| 12,190,594 | B2 * | 1/2025 | Griesmer | G06V 20/17 |
| 2003/0032476 | A1 * | 2/2003 | Walker | G06Q 20/00 705/14.15 |
| 2005/0125280 | A1 * | 6/2005 | Carr | G06Q 30/02 705/26.7 |
| 2013/0144880 | A1 * | 6/2013 | Kemmer | G06Q 10/06 707/737 |
| 2017/0213208 | A1 * | 7/2017 | Downs | G06Q 20/34 |
| 2019/0019160 | A1 * | 1/2019 | Champaneria | G06N 5/04 |
| 2020/0272835 | A1 * | 8/2020 | Cheng | B60W 50/14 |
| 2021/0365919 | A1 * | 11/2021 | Kumar | G06Q 40/10 |
| 2022/0180391 | A1 * | 6/2022 | Prakash | G06Q 30/0205 |
| 2022/0261688 | A1 * | 8/2022 | Nimavat | G06N 20/00 |
| 2022/0366461 | A1 * | 11/2022 | Shariff | G06Q 10/0635 |
| 2023/0186346 | A1 * | 6/2023 | Perge | G06N 20/00 705/14.49 |
| 2023/0298080 | A1 * | 9/2023 | Drerup | G06N 3/092 705/26.43 |

OTHER PUBLICATIONS

Wen J, Abe T, Suganuma T. A Customer Behavior Recognition Method for Flexibly Adapting to Target Changes in Retail Stores. Sensors (Basel). Sep. 6, 2022, accessed at < https://pmc.ncbi.nlm.nih.gov/articles/PMC9504441/> (Year: 2022).*

* cited by examiner

1. Priortization Tiers

Priortization Logic

Annual Spend

Spend Limit by Tier $0 $5M $10000 $1M

Long-Tail Mid Tier Strategic

Spend share

22% 53% $20M 25%

Supplier share

60% 500 18% 22%

Reset Apply

2. Updated Payment Terms

3. Message Strength

4. Conversion Rate

230

Campaign Summary

Customer 1

Supplier 1

Provider 1

How did campaigns perform this year?

82

132

530

49

127

301

Campaign Performance Breakdown

All Suppliers

Enrolled

In-Progress

Returned

Conditional Win

Declined

Not Workable

Total Target Spend $1.6B

270

Supplier Details

| Submitted Merchant | Matched Merchant | Acceptance Category | Acceptance Sub-category* |
|---|---|---|---|
| Supplier 1 | Supplier 1 | Known | Provider Acceptor |
| Supplier 2 | Supplier 2 | Known | Issuer Acceptor |
| Supplier 3 | Supplier 3 | Potential | Mastercard Acceptor |
| Supplier 4 | Supplier 4 LCC | Potential | Unlikely Acceptor |
| Supplier 5 | Supplier 5 | Potential | Mastercard Acceptor |
| Supplier 6 | Supplier 6 | Known | Track Acceptor |

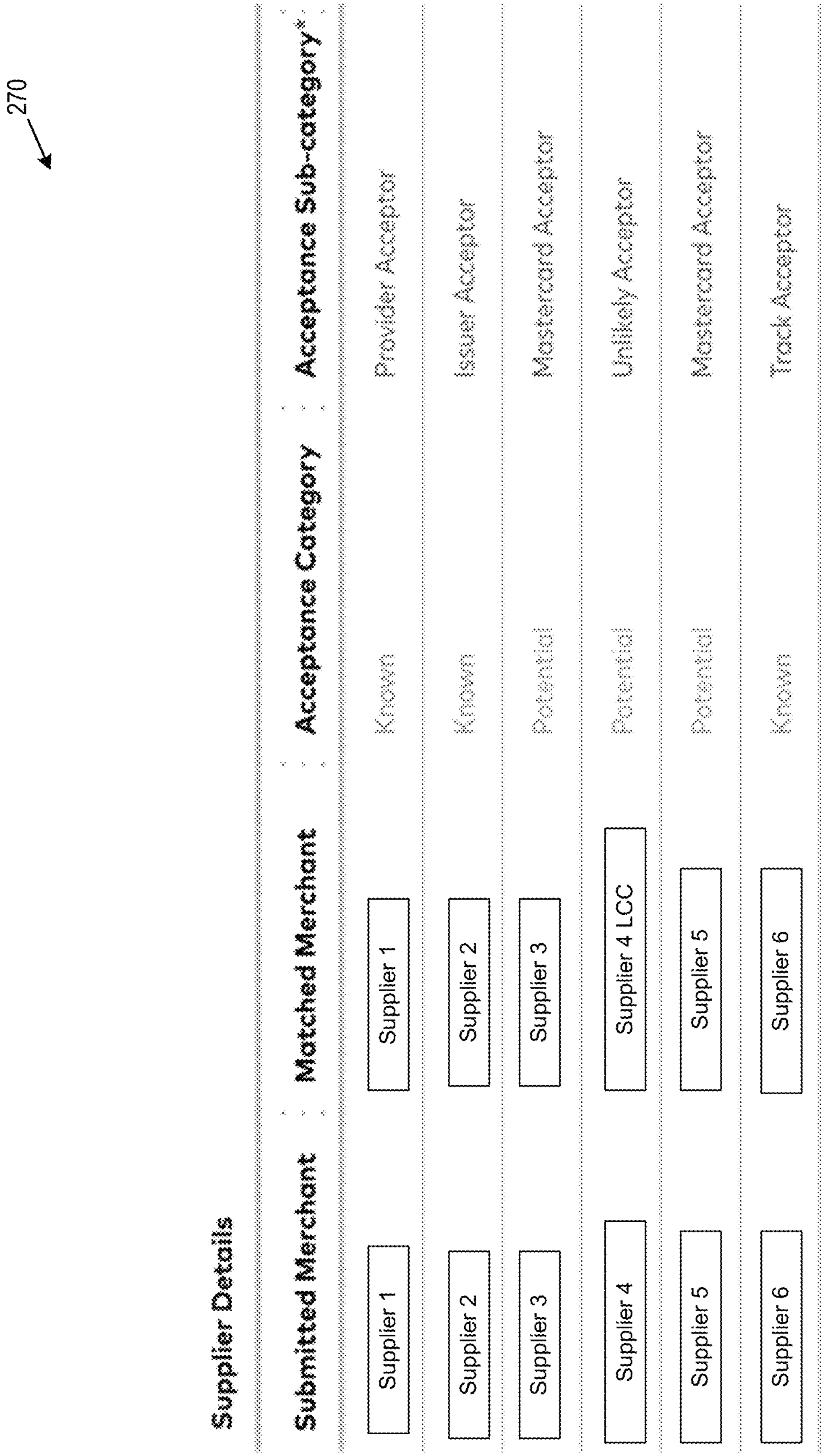

FIG. 8

Projected Conversion $2.5M $8M $5.5M

Known Acceptors

Potential Acceptors

Conversion Rate 12.6%

Conversion Rate $80M $70M $60M $50M $40M $30M $20M $10M $0

$64M $8M

Total Opportunity

Cardable Opportunity

Total Opportunity

Cardable Opportunity

INTELLIGENCE TOOL FOR VENDOR ENABLEMENT CAMPAIGNS

BACKGROUND

It may be desirable for commercial card issuers to increase commercial card acceptance across the vendor community, for example to grow the commercial card issuer's portfolio. To this end, commercial card issuers often run campaigns to encourage vendors to accept a card offer. However, running effective campaigns can be technically challenging, for example successful outreach may be difficult across the variety of different types and industries of vendors. Moreover, it may be technically difficult, costly in terms of computing resource usage, and/or time-consuming for commercial card issuers to measure the performance of their campaigns.

SUMMARY

In one aspect, a system includes a processor and a memory including computer program code. The memory and the computer program code are configured to, with the processor, cause the processor to: receive historical campaign data; determine a likelihood that a vendor will accept a card offer by inputting the historical campaign data into a machine learning model that has been trained for at least one campaign using training data comprising past campaign performance data; automatically recommend a campaign strategy tailored for the vendor using the machine learning model, wherein the recommended campaign strategy is an output of the machine learning model that is based on the determined likelihood that the vendor will accept the card offer; and automatically display the recommended campaign strategy output from the machine learning model on a graphical user interface (GUI).

In another aspect, a system includes a processor and a memory including comprising computer program code. The memory and the computer program code are configured to, with the processor, cause the processor to: receive historical campaign data; determine, using a machine learning model that has been trained for a campaign, card acceptance states of vendors using the historical campaign data; automatically, using the machine learning model, prioritize the vendors based on the historical campaign data and the determined card acceptance states of the vendors; and automatically display, on a graphical user interface (GUI), a prioritized list of the vendors output from the machine learning model.

In another aspect, a system includes a processor and a memory including computer program code. The memory and the computer program code are configured to, with the processor, cause the processor to: update historical campaign data with an outcome of a campaign; provide the updated historical campaign data as input to a machine learning model trained for the campaign; determine feedback data indicating accuracy of the machine learning model using an output of the machine learning model and the outcome of the campaign; and adjust at least one parameter of the machine learning model using the determined feedback data, wherein the machine learning model is adjusted to be more accurate at determining campaign performance.

BRIEF DESCRIPTION OF THE DRAWINGS

FIG. 8 is an example of a display of a GUI that displays a prioritized list of vendors according to an implementation.

DETAILED DESCRIPTION

Figure 1:
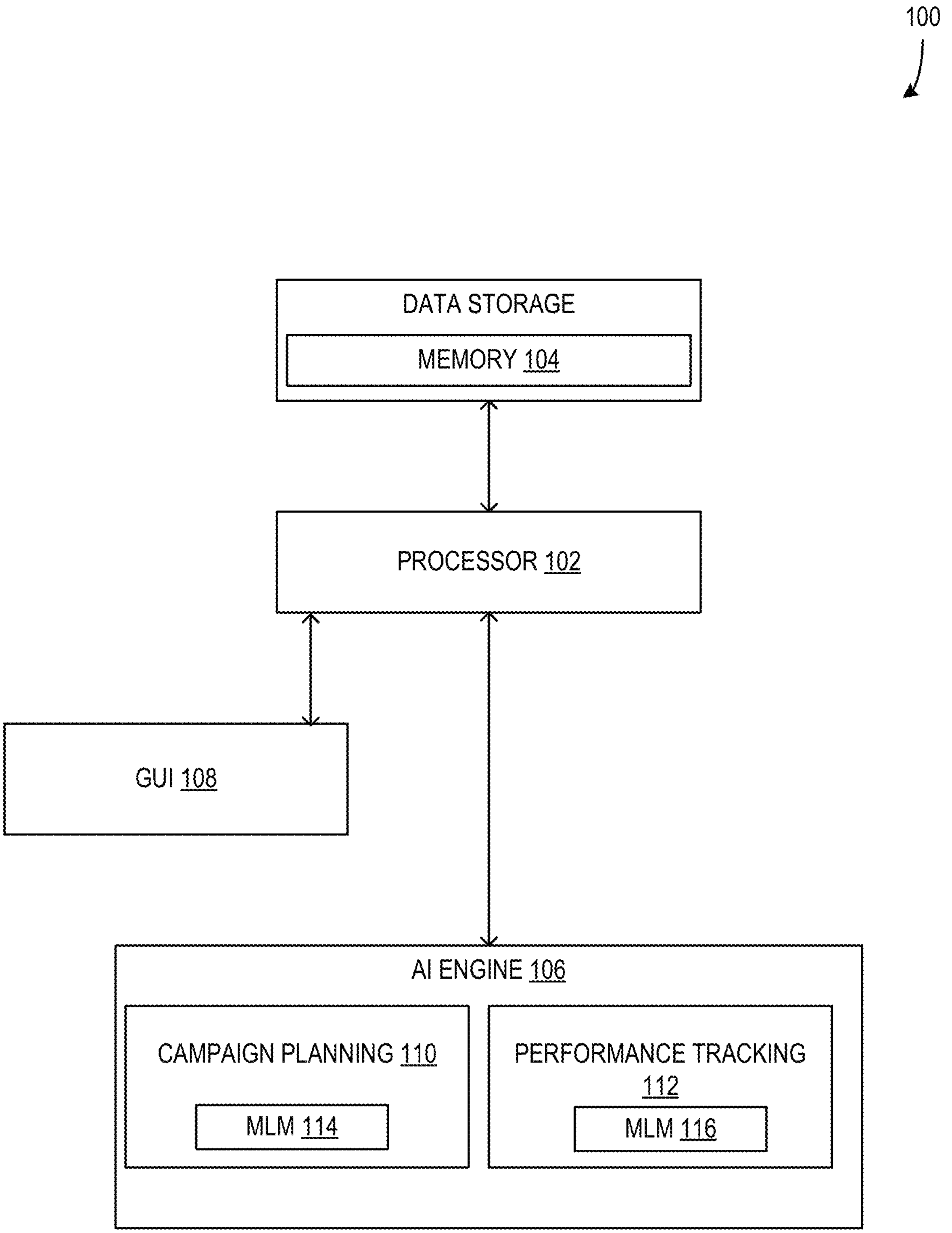
FIG. 1 is a block diagram illustrating a system for planning and monitoring the performance of card acceptance campaigns according to an implementation.

It may be desirable for commercial card issuers to increase commercial card acceptance across the vendor community, for example to grow the commercial card issuer's portfolio. To this end, commercial card issuers often run campaigns to encourage vendors to accept a card offer. However, running effective campaigns can be challenging, for example successful outreach may be difficult across the variety of different types and industries of vendors. Moreover, it may be difficult, costly, and/or time-consuming for commercial card issuers to measure the performance of their campaigns, for example because known methods for running and measuring the performance of campaigns rely on manual entry of data of a plurality of different types and/or from a plurality of different sources.

Aspects of the disclosure provide a system and method that includes an intelligence tool that automatically leverages a variety of datasets to recommend a campaign strategy and automatically aids in measuring the effectiveness of vendor (e.g., supplier, a merchant, etc.) enablement campaigns, for example including automatically analyzing a corporate's (e.g., a bank, a card issuer, a customer, a provider, a corporate buyer, etc.) Accounts Payable (AP) file, historical campaign data, and/or the like. The data driven approach disclosed herein may facilitate smarter campaigns and/or capture opportunities to drive more commercial card acceptance. For example, systems, methods, models, tools, and/or the like disclosed herein may automatically learn from historical campaign results and may automatically compute a tailored outreach to each vendor (e.g., recommend best outreach strategy to win a vendor, etc.), for example to increase (e.g., maximize, etc.) the conversion rate. In some examples, recommendations are tailored for each vendor and take a buyer-vendor relationship into account. In some examples, the disclosed intelligence tool may automatically establish a feedback loop by measuring what's working and what's not working, which may (e.g., automatically, etc.) enable the system to learn from new campaign results (e.g., to identify areas of missed opportunities and improve future campaigns, etc.). In some examples, the disclosed intelligence tool provides flexibility to enable a user to override an automatic recommendation and/or to select a consistent recommendation approach.

In some examples, aspects of the disclosure provide a tool that produces a number of data-driven recommendations and insights to help optimize supplier enablement campaigns. Some examples of the tool use historical campaign data to continuously learn from prior outreach and recommend the optimal outreach strategy for each vendor, including, but not limited to, the payment terms to recommend and/or the narrative to convey to a vendor to convince them to accept. For example, the tool leverages historical campaign data to see how campaigns fared previously (e.g., which parameters were successful, etc.), and is thereby able to tailor recommendations for a campaign, for example from a particular card issuer to a vendor. The system continuously tracks the performance of each outreach and uses the resulting data to improve future recommendations, for example by measuring what actually worked in the past for similar (e.g., lookalike, sharing at least one attribute, etc.) vendors.

Some examples of the tools disclosed herein analyze the results of a campaign along with historical data to identify areas of missed opportunity, e.g., declined or returned vendors that have a higher-odds (e.g., odds above a threshold, relative odds, etc.) conversion based on prior outreach. For example, at least some of the tools disclosed herein can identify declined vendors that are known acceptors for other clients (or, for example, vendors that declined acceptance but may be likely to change their mind with an additional phone call) based on the vendor's profile and prior acceptance patterns found in the historical campaign data.

In some examples, vendor attrition is predicted by analyzing one or more vendor's transaction activity over time. For example, by identifying scenarios where vendors exhibit a stepwise change in transaction volume, commercial issuers can predict potential vendor attrition before it actually occurs. For example, recommendations may be created by using historical supplier transaction data to train the tool on potential attrition, and a model created to predict future attrition. In some examples, performance is compared across vendors, corporates, and/or the like to identify actual spend not yet performing vs target spend, and thereby predict possible attrition.

In some examples, aspects of the disclosure provide a corporate acceptance/payment tool, for example in addition or alternative to a vendor enablement campaign tool (e.g., a campaign planner, a performance tracker, etc.). In some examples, the tool provides automated acceptance links and/or portals displayed on a graphic user interface (GUI), for example with an ability to negotiate the acceptance criteria.

In some aspects of the disclosure, a system receives historical campaign data; determines a likelihood that a vendor will accept a card offer by inputting the historical campaign data into a machine learning model that has been trained for at least one campaign using training data comprising past campaign performance data; automatically recommends a campaign strategy tailored for the vendor using the machine learning model, wherein the recommended campaign strategy is an output of the machine learning model that is based on the determined likelihood that the vendor will accept the card offer; and automatically displays the recommended campaign strategy output from the machine learning model on a GUI.

In some aspects, a system receives historical campaign data; determines, using a machine learning model that has been trained for a campaign, card acceptance states of vendors using the historical campaign data; automatically, using the machine learning model, prioritizes the vendors based on the historical campaign data and the determined card acceptance states of the vendors; and automatically displays, on a GUI, a prioritized list of the vendors output from the machine learning model.

In some aspects, a system updates historical campaign data with an outcome of a campaign; provides the updated historical campaign data as input to a machine learning model trained for the campaign; determines feedback data indicating accuracy of the machine learning model using an output of the machine learning model and the outcome of the campaign; and adjusts at least one parameter of the machine learning model using the determined feedback data, wherein the machine learning model is adjusted to be more accurate at determining campaign performance.

The disclosure operates in an unconventional manner at least by recommending campaign strategies and/or aiding in measuring the effectiveness of vendor enablement campaigns. The disclosure provides a data driven approach that enables commercial card issuers to run smarter campaigns and capture opportunities to drive more commercial card acceptance. For example, the disclosure operates in an unconventional manner to provide a tailored approach for yielding an increased conversion rate. Moreover, and for example, the intelligence tool of the disclosure operates in an unconventional manner to measure what's working and what's not working, which helps identify areas of missed opportunities and improve future campaigns. Further, the disclosure operates in an unconventional manner to enable a card issuer to continuously track the performance of each outreach and use the resulting data to improve future recommendations, for example by measuring what actually worked in the past for similar vendors. Additionally, the disclosure operates in an unconventional manner to analyze the results (e.g., the outcome, etc.) of campaigns, for example to determine missed opportunities, spend realization, and/or potential attrition, which facilitates card issuers running smarter campaigns and captures opportunities to drive more commercial card acceptance.

FIG. 1 is a block diagram illustrating a system 100 configured for planning and monitoring (e.g., tracking, analyzing, etc.) the performance of card acceptance campaigns. In some examples, the system 100 includes a processor 102 and a memory 104 configured to store computer program code. The memory 104 and the computer program code are configured to, with the processor 102, cause the processor 102 to perform various operations, functions, steps, and/or the like of the system 100 (e.g., the various operations, functions, steps, and/or the like described and/or illustrated herein, etc.). In some examples, the system 100 includes an Artificial Intelligence (AI) engine 106 (e.g., including a machine learning model, etc.) that analyzes stored data using one or more trained models to generate campaign information (e.g., campaign planning and/or strategy information, analyzing outcomes of historical and/or recommended campaign strategies, monitoring the performance of historical and/or recommended campaign strategies, etc.) that can be provided for display via a graphical user interface (GUI) (e.g., as described and/or illustrated herein; a GUI 108 of the system 100; a GUI of another system, computing device, electronic device, server, and/or the like; etc.) and/or used for other purposes.

The AI engine 106 includes one or more modules for performing various functions, operations, steps, and/or the like of the system 100. For example, in the exemplary implementation of FIG. 1, the system 100 includes a campaign planning module 110 and a performance tracking module 112. The AI engine includes one or more machine learning models (e.g., the machine learning model (MLM) 114 and/or the MLM 116 of the modules 110 and 112, respectively) for performing the operations, functions, steps, and/or the like of the various systems and methods disclosed herein.

Figure 2:
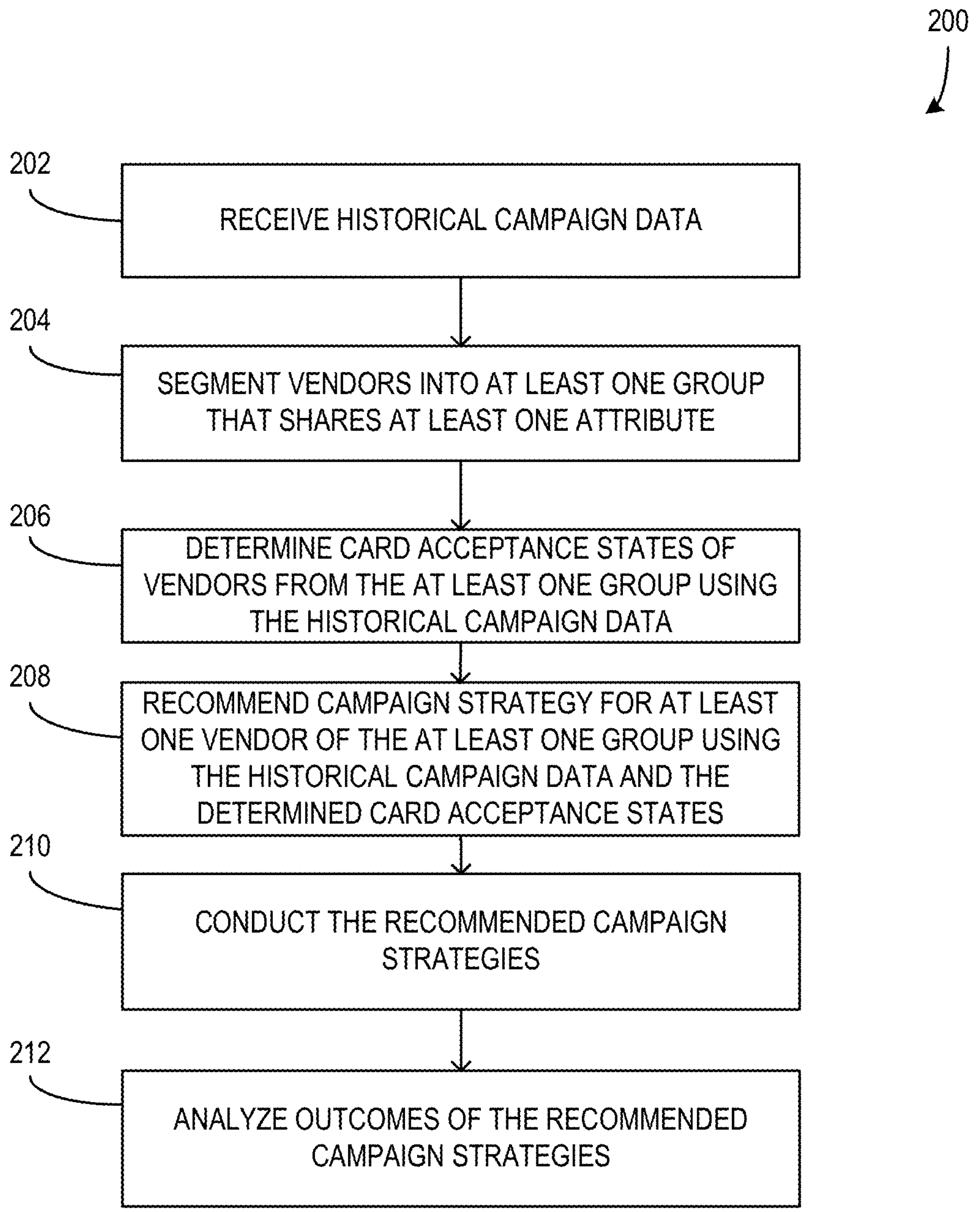
FIG. 2 is a flowchart illustrating an example of a method of the system shown in FIG. 1 according to an implementation.

FIG. 2 is a flowchart illustrating an example of a method 200 of operations, functions, steps, and/or the like of the system 100 (shown in FIG. 1). At 202, the processor 102 is configured to receive historical campaign data. At 204, the processor 102 is configured to segment vendors into at least one group of the vendors that share at least one attribute. At 206, the method 200 includes determining card acceptance states of vendors from the at least one group of vendors using the historical campaign data. The method 200 further includes, at 208, recommending a campaign strategy for at least one vendor of the at least one group of vendors using the historical campaign data and the determined card acceptance states. At 210, the processor 102 is configured to conduct the one or more recommended campaign strategies. The processor 102 is configured to analyze outcomes (e.g., a result, etc.) of the one or more recommended campaign strategies at 212 of the method 200.

In some examples, the historical campaign data received by the processor 102 at 202 is input into a machine learning model (e.g., a model of the campaign planning module 110, of the performance tracking module 112, etc.) of the AI engine 106. Examples of the data that may be used (e.g., uploaded to, onboarded to, input to, received by, analyzed, processed, manipulated, etc.) by the system 100 (FIG. 1) include, but are not limited to, campaign data, the historical campaign data (e.g., a campaign outcome, campaign performance data, past campaign performance data, any of the data listed herein as being included within "campaign data", etc.), individual (e.g., new, current, upcoming, past, potential, etc.) campaign data, customer data, transaction data, a transaction data extract, vendor data, corporate buyer details, an AP file, a customer AP file, a list of known acceptors, customer primary account numbers (PANs), customer names and identification (ID), a customer RNC, and/or the like. Campaign data may include, but is not limited to, data associated with vendor enablement campaigns including, but not limited to, buyer and/or vendor metadata, vendor response (e.g., accept, decline, etc.), other campaign information, and/or the like. In some examples, data used by the system 100 may include a mapping between RNCs and buyer name, which may facilitate identifying bank's corporate customers in (e.g., a particular card issuer's, etc.) transaction data. In some examples, a customer AP file includes a list of vendors for a given customer along with vendor metadata and current payment method and terms. In some examples, a known acceptor list includes a bank-provided known acceptor list, which in some examples is combined with a particular card issuers acceptance data. As used herein, a "buyer" may include a client of the vendor.

In some examples, campaign data used by the system 100 includes a campaign name, a customer ID, a submitted vendor ID (e.g., an issuer's vendor ID, etc.), a vendor name, a vendor address, a submitted state (e.g., the submitted state of a vendor, etc.), a submitted postal code of a vendor, a reason (e.g., a reason of a campaign such as, but not limited to, max attempts, non-acceptor, better contact info, and/or the like), an annual target spend (e.g., based on prior year spend, etc.), a transaction count (e.g., based on prior year spend, etc.), a campaign status date (e.g., date of last modification to status, etc.), a status of a campaign (e.g., won, return, etc.), a sub-status of a campaign (e.g., status of vendor in a campaign such as, but not limited to, declined, in-progress, won, etc.), a campaign reporting date, a vendor phone, a vendor email, a vendor tax ID, existing terms (e.g., payment terms, etc.), a current payment method (e.g., check, electronic, etc.), and/or the like. Other examples of campaign data used by the system include, but are not limited to, a vendor manager name, a vendor manager title, a vendor manager email, a caller name (e.g., a POC caller name, etc.), a caller phone (e.g., a POC caller phone, etc.), a caller email (e.g., a POC caller email, etc.), a payment remitter email (e.g., account holder or first person of contact email, etc.), a payment remitter name (e.g., account holder or first person of contact name, etc.), a payment remitter phone (e.g., account holder or first person of contact phone, etc.), a payment remitter email 2 (e.g., substitute account handler/person of contact email, etc.), a payment remitter name 2 (e.g., substitute account handler/person of contact name, etc.), a payment remitter phone 2 (e.g., substitute account handler/person of contact phone, etc.), a payment fax number (e.g., account handler/person of contact fax number, etc.), a payment website (e.g., account handler/person of contact website, etc.), a vendor location id (e.g., unique to each vendor, a duplicate, non-unique, etc.), notes (e.g., comments section to specify reason for campaign status, etc.), SIP/BIP (e.g., supplier/buyer initiated payment, etc.), surcharge (e.g., a payment fee, etc.), surcharge type (e.g., a payment type, etc.), a campaign waive number (e.g., campaign IDs that are the same, etc.), segmentation volume tiers (e.g., priority-vendor segmentation-Tier assigned, for example T1/T1/T2, etc.), and/or the like.

In some examples, customer PAN and customer name and/or ID data includes a customer name (e.g., a customer name identified from a customer code, etc.), a credit card PAN (e.g., a credit card Pan number, etc.), a customer ID (e.g., a unique individual customer identification, etc.), and/or the like. In some examples, a transaction data extract includes a client name field, a company number field, a vendor name field, a vendor ID field, a VCN field, a transaction date field, a payment amount field, a vendor street address field, a vendor city field, a vendor state field, a vendor zip code field, a vendor tax ID, and/or the like.

In some examples, a customer AP file used by the system includes a vendor ID (e.g., an issuer's vendor ID, etc.), a vendor name, a vendor address, a vendor state, a vendor postal code, an annual target spend (e.g., based on prior year spend, etc.), a transaction count (e.g., based on prior year spend, etc.), a vendor phone, a vendor email, a vendor tax ID, a vender Merchant Category Code (MCC), an existing payment term, a current payment term (e.g., check, electronic, etc.), and/or the like.

In some examples, the method 200 is performed using the system 100 including using the AI engine 106 (shown in FIG. 1). For example, in some examples at least one (e.g., one, some, all, etc.) of the steps of the method 200 is at least partially performed a machine learning model (e.g., the MLM 114, the MLM 116, etc.) of the AI engine 106. In other words, in some examples, the AI engine 106 includes hardware, firmware, and/or software configured to use one or more machine learning models to perform one or more operations, functions, steps, and/or the like of the system 100 (e.g., a portion or all of: the method 200, the method 300, the method 400, the method 500, and/or the like). For example, the AI engine 106 includes hardware, firmware, and/or software configured to use one or more machine learning models to perform planning and monitoring (e.g., tracking, analyzing, etc.) of the performance of card acceptance campaigns. In some examples, the one or more machine learning models of the AI engine 106 are trained using machine learning techniques to perform operations such as operations of the system 100 disclosed herein. As used herein, any operations, functions, steps, and/or the like of the system 100 (and/or otherwise disclosed herein) that are performed by one or more machine learning models is considered an "automatic" performance (e.g., performed automatically, performed without manual intervention, etc.) by the machine learning model(s).

In some examples, the computer program code is further configured to cause the processor 102 (shown in FIG. 1) to obtain training data and train the machine learning model for at least one campaign, wherein the training data includes any of the data disclosed herein (e.g., any data disclosed herein as being used by the system 100, the data disclosed above used by the system 100 with respect to the method 200 of FIG. 2, etc.). In some examples, the training data includes the historical campaign data and/or past campaign performance data (e.g., from the historical campaign data, etc.) that includes campaign outcomes (e.g., a campaign result, under at least one condition, under at least one parameter of the campaign strategy, etc.). The training includes providing the past campaign performance data to the machine learning model as input. The training includes determining feedback data indicating accuracy of the machine learning model using output of the machine learning model and the past campaign performance data, and the training includes adjusting at least one parameter of the machine learning model using the determined feedback data, wherein the machine learning model is adjusted to be more accurate at recommending future campaign strategies. For example, the machine learning model may be adjusted to be more accurate at recommending a campaign strategy that is more likely to be accepted.

During and after the training process, the machine learning models disclosed herein are configured to receive input requests and apply a map to the input requests, which includes categorization or classification logic that maps the requests to output requests. The machine learning models disclosed herein determine output responses to the input requests based on the application of the map. During the training process, the map is altered, adjusted, or otherwise changed based on the training data, such that, after training is complete, application of the map to the input requests yields output responses that are the same as or at least substantially similar to the responses associated with the same input requests in the training data. The training of the machine learning model and associated adjustments made to the map may be based on analysis of the training data, identification of patterns of requests that are associated with particular responses or types of responses, etc. Further, in some examples, the training of the machine model and adjustment of the map is performed using deep learning classification algorithms and/or other machine learning techniques.

In some examples, the AI engine 106 includes a machine learning module that comprises a trained regressor such as a random decision forest, a directed acyclic graph, a support vector machine, a convolutional neural network or other neural network, another trained regressor, and/or the like. Such a trained regressor may be trained using the training data as feedback data. It should further be understood that the machine learning module, in some examples, operates according to machine learning principles and/or techniques known in the art without departing from the systems and/or methods described herein.

In an example, the machine learning module of the AI engine 106 makes use of training data pairs when applying machine learning techniques and/or algorithms. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms.

As described above, at 204 the method 200 includes segmenting the vendors into at least one group of the vendors that share at least one attribute. The at least one attribute may include any attribute, such as, but not limited to, a vendor (e.g., supplier, etc.) industry, an industry type, an annual spend, an annual transaction volume, a number of annual transactions, an average transaction size, a current payment term, a new payment term, a current payment method, a client type, a vendor-client relationship, and/or the like.

As also described above, the method 200 includes, at 206, determining card acceptance states of vendors from the at least one group of vendors using the historical campaign data. In some examples, the card acceptance states determined at 206 include a known state, a potential state, and/or the like. The known state indicates that the corresponding vendor has accepted a card payment in the past. The potential state indicates that the corresponding vendor has not accepted at least a type of card payment in the past. For example, the potential state may indicate that the corresponding vendor is not known to have accepted any card payments in the past. In another example, the potential state may indicate that the corresponding vendor has not accepted a particular type of card payment (e.g., from a particular card issuer, etc.) in the past.

In some examples, determining at 206 the card acceptance states of vendors from the at least one group includes determining at least one card acceptance sub-state of at least one of the vendors from the at least one group. For example, a card acceptance sub-state may indicate at least one of type of card payment that the corresponding vendor has accepted in the past, may indicate a likelihood that the corresponding vendor will accept a card payment, and/or the like.

Referring again to step 208, the method 200 includes recommending campaign strategies for at least one vendor of the at least one group of vendors using the historical campaign data and the determined card acceptance states. For example, historical data is leveraged to determine the vendor's likelihood of accepting card, and a recommendation is made based on the determined likelihood. As will be described below, in some examples, an outcome of a campaign and/or a campaign strategy may be fed into the historical data to improve the AI engine 106, future machine learning models, and/or the like.

In some examples, recommending a campaign strategy at 208 includes determining a likelihood that a vendor will accept the card offer using the historical campaign data and at least one determined card acceptance state of the vendor, wherein the recommended campaign strategy for the vendor is determined using the historical campaign data and the determined likelihood that the vendor will accept the card offer. In some examples, determining the likelihood that the vendor will accept the card offer includes determining the vendor's likelihood of accepting the card offer under at least one condition such as, but not limited to, payment acceleration (e.g., with payment acceleration, without payment acceleration, etc.), message strength (e.g., communicating with the vendor with a soft message strength, communicating with the vendor with a hard message strength, etc.), and/or the like. Determining the likelihood that the vendor will accept the card offer may include calculating a propensity score (e.g., a propensity score based on a value of a number of other vendors that have accepted a past card offer, etc.). In some examples, determining the likelihood that the vendor will accept the card offer includes determining one or more other vendors that accepted the card offer under a condition, parameter, and/or the like of the campaign strategy. Determining the likelihood that a vendor will accept a card offer may include, in some examples: comparing a current campaign with the historical campaign data to define a group of other vendors that share at least one attribute with the vendor; and identifying at least one of the other vendors that accepted a past card offer under at least one condition (e.g., payment acceleration, message strength, etc.) using the historical campaign data.

In some examples, recommending the campaign strategy for the at least one vendor includes recommending a payment term to recommend to the vendor, a narrative to convey to the vendor, and/or the like. In some examples, recommending the campaign strategy includes recommending a condition if the determined likelihood is above a threshold value (e.g., a threshold percentage value, etc.). For example, recommending the campaign strategy for a vendor may include recommend payment acceleration if the determined likelihood is above a threshold value, recommending a message strength if the determined likelihood is above a threshold value, and/or the like. In some examples, a payment acceleration condition, a message strength condition, and/or other condition is recommended if the determined likelihood increases over a baseline likelihood value (e.g., an average likelihood considering the outcomes of two or more conditions, etc.) by a threshold value.

TABLE 1

| | No Acceleration | Yes Acceleration | Total |
|---|---|---|---|
| Soft Message | 0/2 = 0% | 1/1 = 100% | 1/3 = 33% |
| Hard Message | 0/1 = 0% | 1/1 = 100% | 1/2 = 50% |
| Total | 0/3 = 0% | 2/2 = 100% | 2/5 = 40% |

For example, Table 1 indicates campaign outcomes (e.g., results, etc.) based on payment acceleration and message strength conditions. As shown in Table 1, the baseline likelihood is computed to be 40%. In the example of Table 1, offering a hard message only increases the likelihood of campaign success by 10% (from the baseline likelihood of 40% to 50% as shown in Table 1). Accordingly, if the threshold is selected as 15%, the recommended campaign strategy will not include a hard message recommendation because the increase of 10% is less than the threshold of 15%. On the other hand, in the example of Table 1, offering payment acceleration increases the likelihood of campaign success by 60% (from the baseline likelihood of 40% to 100% as shown in Table 1). Accordingly, if the threshold is selected as 15%, the recommended campaign strategy will include a payment acceleration recommendation because the increase of 60% is greater than the threshold of 15%. Although the threshold in the example of Table 1 is 15%, any other value may be selected as the threshold.

Referring again to step 210, the method 200 includes conducting the one or more recommended campaign strategies. In some examples, a bank and/or other card issuer (e.g., a customer, a provider, a corporate buyer, etc.) receives the recommendation and transmits it to a 3$^{rd}$ party service provider and/or a vendor for campaign outreach. In some examples, the system 100 (e.g., the processor 102, a machine learning model, etc.) automatically sends the recommendation directly to a card issuer, the 3$^{rd}$ party service provider, and/or the vendor (e.g., automated emails, etc.). In some examples, a 3$^{rd}$ party service provider includes an acquirer, a payment facilitator, an AR automation player, a call center, and/or the like.

In some examples, the method 200 includes displaying on the GUI 108 (shown in FIG. 1) one or more of the following: historical campaign data; a likelihood that a vendor will accept a card offer; a recommended campaign strategy; a vendor's likelihood of accepting card with or without payment acceleration; a vendor's likelihood of accepting card with soft or hard message strength; a vendor's likelihood of accepting card based on message strength; a propensity score; one or more other vendors that accepted card under a condition, parameter, and/or the like of the campaign strategy; one or more other vendors that accepted card under a condition including payment acceleration, message strength, etc.; and/or the like.

Figure 3:
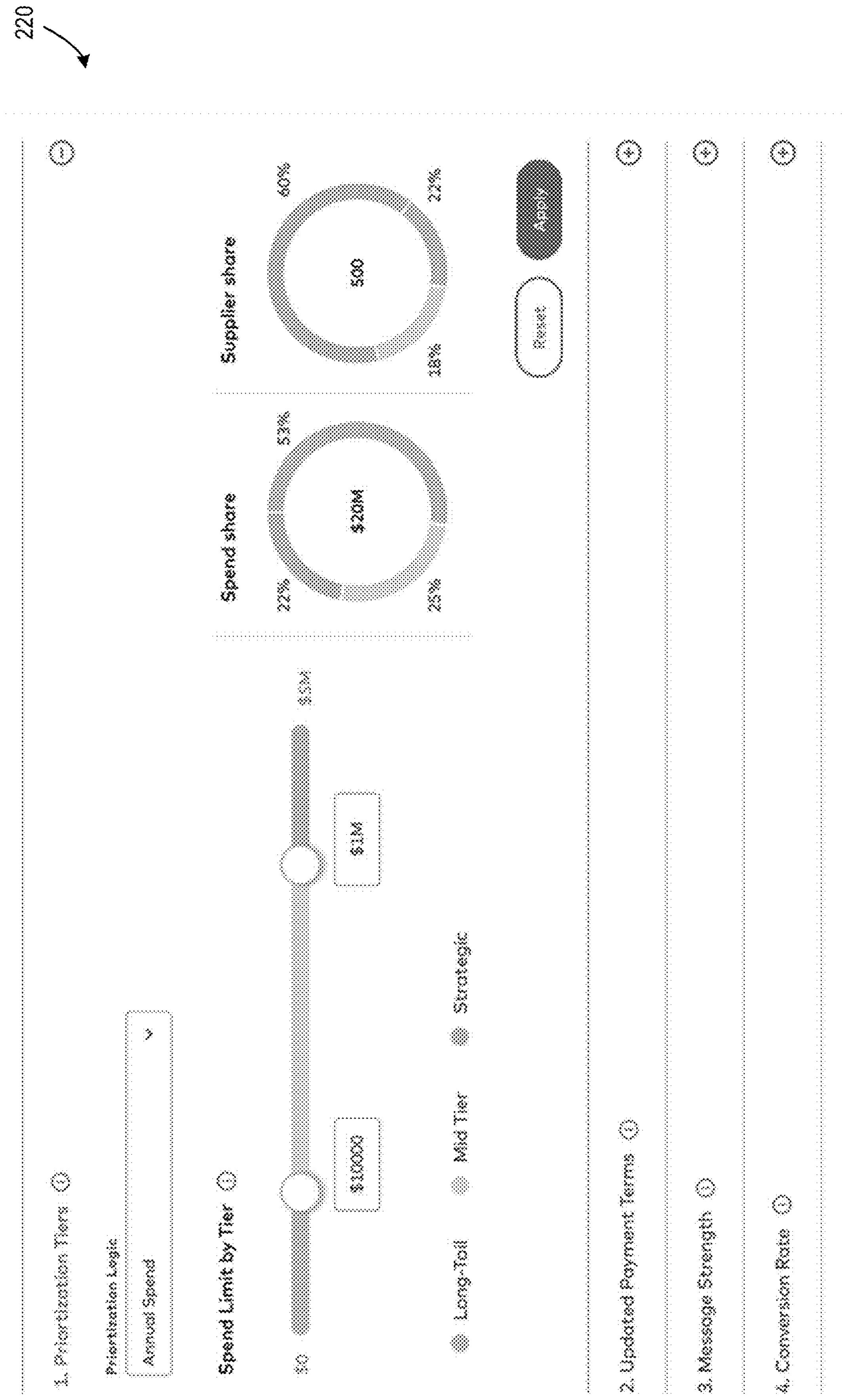
FIG. 3 is an example of display of a graphical user interface (GUI) that enables a user to customize a campaign strategy according to an implementation.

In some examples, the method 200 includes displaying on the GUI 108 a user input that enables a user to use the GUI to, for example: customize a recommended campaign strategy; customize a condition, parameter, and/or the like of the campaign strategy; override a recommended campaign strategy, and/or the like. For example, FIG. 3 illustrates an example of the GUI 108 displaying a customization page 220 that includes user inputs that enable a user to customize a campaign strategy. Although any other parameter, condition, and/or the like of the campaign strategy may be customized by the user using the customization page 220, the exemplary fields shown in FIG. 3 enable the user to at least customize an annual spend parameter, payment term conditions, a message strength condition, a conversion rate, and/or the like.

Referring again to step 212, the method 200 includes analyzing outcomes of the one or more recommended campaign strategies. For example, outcomes of campaign strategies are analyzed at 212 using a machine learning model (e.g., the MLM 114 and/or 116, etc.) trained for at least one campaign. In some examples, analyzing the outcomes of the one or more recommended campaign strategies includes determining performance of a campaign based on a profile of a vendor and at least one pattern found in the historical campaign data.

In some examples, analyzing outcomes of the one or more campaign strategies includes analyzing the historical campaign data and at least one outcome of a campaign to at least one of: identify a missed opportunity; identifying at least one of a declined or returned vendor; at least one of a declined or returned vendor having a likelihood of conversion above a threshold; identify at least one of a declined or returned vendor that is a known acceptor for another card and/or client; identify a declined vendor that declined acceptance but may be likely to change their mind with an additional phone call; and/or the like.

In some examples, analyzing outcomes of the one or more campaign strategies includes determining one or more of: a largest missed opportunity, missed opportunity as a percentage of total opportunities, a retuned vendor enrolled elsewhere, a declined vendor enrolled elsewhere, at least one of a declined or returned vendor having a likelihood of conversion above a threshold based on prior outreach, a declined vendor that is a known acceptor of other cards, a vendor that declined acceptance but may be likely to change their mind with an additional phone call, and/or the like.

Analyzing outcomes of the one or more campaign strategies at 212 may include, in some examples, predicting vendor attrition. For example, vendor attrition may be predicted by analyzing a transaction activity of one or more vendors over time and/or identifying scenarios where vendors exhibit a stepwise change in transaction volume. Analyzing outcomes of the one or more campaign strategies may include determining one or more of: attrition insights; attrition level; attrition level over time; attrition performance details; analysis of trends; a change in gross dollar volume (GDV); a change in GDV by a client; an analysis of GDV changes by at least one of one or more vendors or one or more clients; a vendor's transaction activity over time; and/or the like.

In some examples, the method 200 includes providing (e.g., receiving, sending, transmitting, acquiring, locating, identifying, etc.) attrition information so the system 100 can automatically drive proactive saving of merchants (e.g., a vendor, etc.). In some examples, the system 100 as it pulls transaction based information, can predict a specific merchant behavior on acceptance growth and/or attrition based on transaction history, average transaction, trending of growth, or declining in concurrent months, and/or the like.

In some examples, analyzing outcomes of the one or more campaign strategies at 212 includes predicting vendor attrition using one or more machine learning models (e.g., the MLM 114 and/or 116, etc.) trained for potential attrition. For example, computer program code may be configured to cause the processor 102 to train the machine learning model for potential attrition, wherein the training includes obtaining training data including historical campaign data with past data including vendor transaction activity. The training includes providing the past data to the machine learning model as input. The training includes determining feedback data indicating accuracy of the machine learning model using output of the machine learning model and the vendor transaction activity. The training includes adjusting at least one parameter of the machine model using the determined feedback data, wherein the machine learning model is adjusted to be more accurate at predicting future attrition.

In some examples, the analyzing step 212 includes determining one or more of: a spend realization, a realized spend, an actual spend not yet performing versus a target spend, a realized spend at the vendor level, a realized spend at the client level, an enrolled supplier having no realized spend; and/or the like. For example, a realized spend may be automatically determined using the campaign data and transaction data. In some examples, determining the realized spend includes one or more of: using an iterative algorithm to look at vendor info, spend, etc., and match that to provide reporting; matching transaction data to campaign data; leveraging campaign data and transaction data, including removing matched items along the way and then loosening a threshold after those have been removed; and/or the like.

Analyzing at 212 outcomes of the one or more campaign strategies may include, in some examples: matching campaign records for a client in campaign data with associated transaction records for the client in the transaction data, and/or matching vendor records for the client in the campaign data with corresponding vendor records in the matched transaction records. In some examples, matching the campaign records with the associated transaction records includes looking for matches of both client and vendor name in the first campaign data and the transaction data, conducting fuzzy matching on both client and vendor name and record matches, and/or removing a matched record and loosening a threshold.

Matching the vendor records for the client in the campaign data with the corresponding vendor records in the matched transaction records may include, but is not limited to: looking for matches of a vendor name in the campaign data and the transaction data; conducting fuzzy matching on a vendor name, address, and zip; and/or removing a matched record and loosening a threshold.

In some examples, the system 100 (e.g., the machine learning model(s) of the AI engine 106, etc.) is configured to automatically display campaign performance on the GUI 108. For example, the method 200 may include displaying the performance of one or more campaign strategies and/or campaigns on the GUI 108, for example using the AI engine 106. Displaying the performance of a campaign and/or campaign strategy on the GUI 108 may include, but is not limited to, displaying one or more of: an outcome (e.g., result, etc.) of a campaign and/or campaign strategy, a summary of performance; a summary of performance over a period of time; a summary of performance of a campaign and/or campaign strategy and one or more other campaigns and/or campaign strategies (e.g., a current snapshot, over a period of time, etc.); details, a parameter, a condition, a configuration, an evolution over time, and/or a breakdown of performance of a campaign and/or campaign strategy; a consolidation of campaign records across different vendors; a consolidation of campaign records across different clients; and/or the like.

Displaying the performance of a campaign and/or campaign strategy on the GUI 108 may include, but is not limited to, displaying one or more of: a spend realization, a realized spend, an actual spend not yet performing versus a target spend, a realized spend at the vendor level, a realized spend at the client level, and/or an enrolled supplier having no realized spend. For example, the method 200 thereby enables a card issuer to see the actual spend by a vendor after the card offer has been accepted by the vendor (e.g., once the card is accepted by the vendor, etc.).

Displaying the performance of a campaign and/or campaign strategy on the GUI 108 may include, but is not limited to, displaying one or more of: a missed opportunity, a largest missed opportunity, missed opportunity as a percentage of total opportunities, a returned vendor enrolled elsewhere, a declined vendor enrolled elsewhere, at least one of a declined or returned vendor having a likelihood of conversion above a threshold based on prior outreach, a declined vendor that is a known acceptor of other cards, and/or a vendor that declined acceptance but may be likely to change their mind with an additional phone call.

In some examples, displaying the performance of a campaign and/or campaign strategy on the GUI 108 may include, but is not limited to, displaying one or more of: attrition insights; attrition level; attrition level over time; attrition performance details; analysis of trends; a change in gross dollar volume (GDV); a change in GDV by a client; an analysis of GDV changes by at least one of one or more vendors or one or more clients; and/or a vendor's transaction activity over time.

In some examples, displaying a recommended campaign strategy on the GUI 108 and/or the performance of a campaign and/or campaign strategy on the GUI 108 may include, but is not limited to, displaying one or more of: a conversion rate, a projected conversion, a conversion rate target, a configuration of the campaign strategy, details of at least one of the vendor or other vendors, a priority of vendors for calling efforts, recommended payment strategy across methods and terms, a customized campaign parameter, a projected spend, a projected value to a client of the vendor, a projected rebate, a projected working capital benefit, projected process cost savings, a recommendation of at least one of payment terms to recommend to the vendor or a narrative to convey to the vendor, a group of other vendors that share at least one attribute with the vendor, a supplier industry, an industry type, an annual transaction volume, a number of annual transactions, annual spend, average transaction size, a current payment term, a payment term, a client type, a vendor-client relationship, an override input, a customization input, and/or the like.

Figure 4:
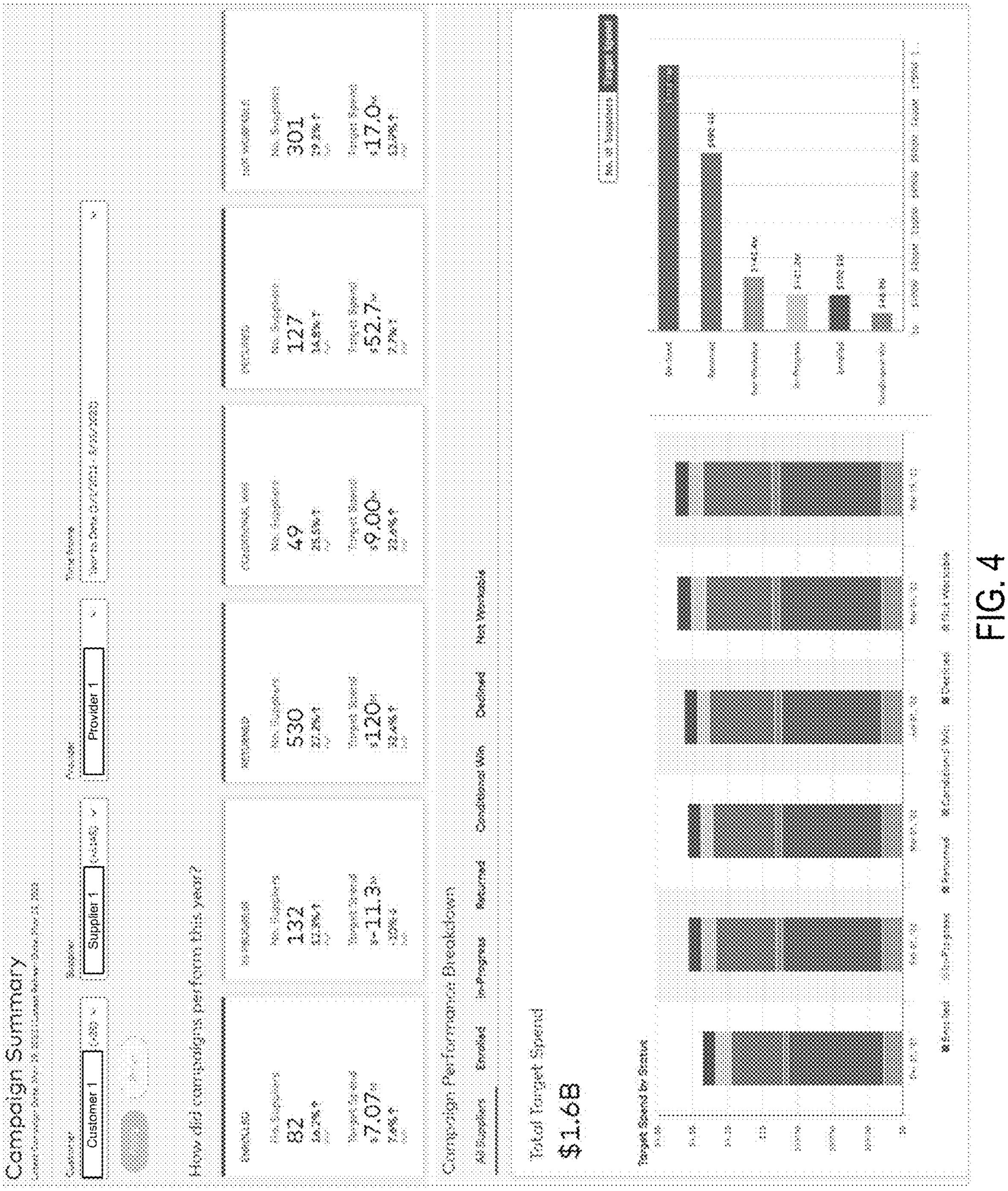
FIG. 4 is an example of display of a GUI that displays a campaign summary page according to an implementation.

Referring now to FIG. 4, FIG. 4 illustrates an example of the GUI 108 displaying a campaign summary page 230 that includes a campaign performance breakdown and a comparison of how different campaigns performed over the past year.

Figure 5:
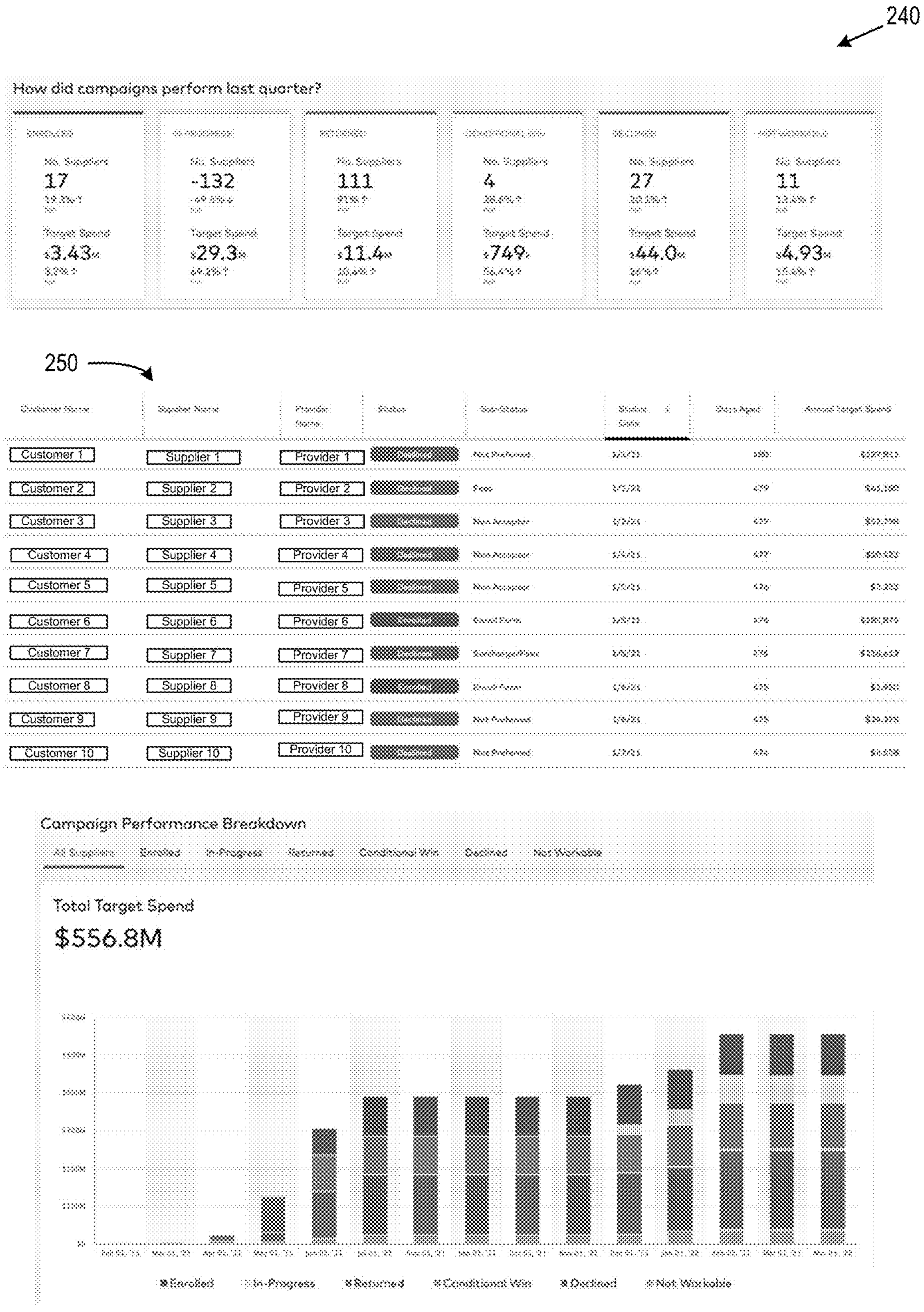
FIG. 5 is an example of display of a GUI that displays a campaign summary page according to an implementation.

FIG. 5 illustrates an example of the GUI 108 displaying various campaign summary pages 240, 250, and 260 that include a comparison of how different campaigns performed over the last quarter, campaign details across different buyers and providers, and a campaign performance breakdown, respectively.

Figure 9:
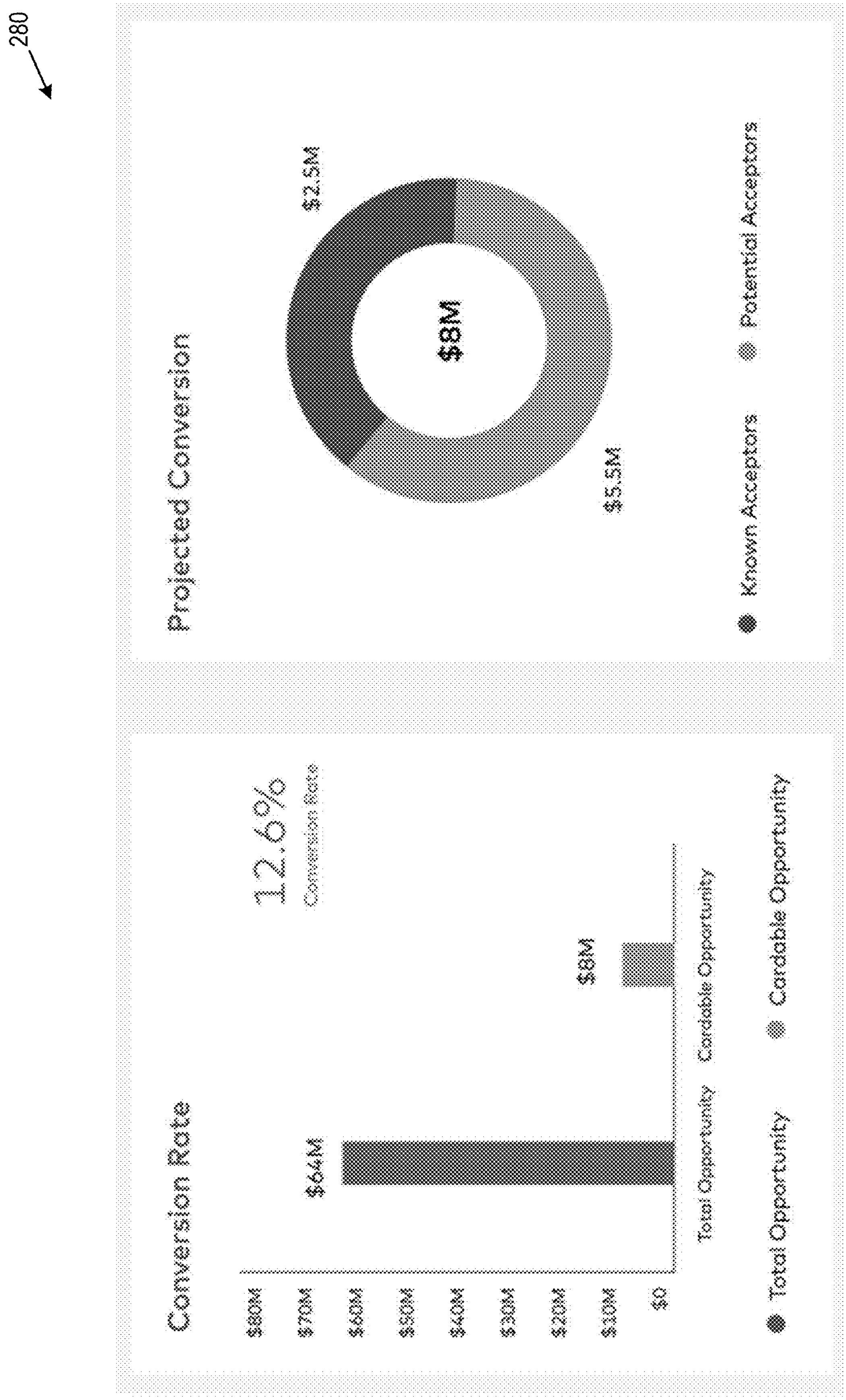
FIG. 9 is an example of a display of a GUI that displays a dashboard view according to an implementation.

Referring again to FIG. 2, in some examples, the method 200 includes displaying an acceptance link, portal, and/or the like (e.g., on the GUI 108; on another GUI, for example a GUI of a vendor, etc.) that enables a vendor to accept a recommended campaign strategy, a campaign, accept card based on a recommended and/or conducted campaign strategy conducted, and/or the like. In some examples, the acceptance link, portal, and/or the like enables the vendor to negotiate one or more acceptance criteria. In some examples, the method 200 includes displaying a dashboard view (e.g., on the GUI 108; on another GUI, for example a GUI of a vendor, etc.) that illustrates a recommended campaign strategy to a vendor. For example, FIG. 9 illustrates an example of automatically displaying on a GUI (e.g., on the GUI 108; on another GUI, for example a GUI of a vendor, etc.) a dashboard view 280 that quantifies opportunities such as, but not limited to, projected spend, value to buyers, rebates, working capital benefits, process cost savings, and/or the like.

In some examples, the method 200 includes analyzing data (e.g., an AP file, historical campaign data, any of the data disclose herein with respect to the method 200 or otherwise, etc.) and sending out the vendors to different providers (e.g., acquirers, payment facilitators, AR automation players, call centers, etc.), and/or emailing one or more (e.g., a group, etc.) vendors directly with a link where vendors can walk through a questionnaire on payment preferences that can connect them to a provider (e.g., acquirer/payment facilitator, etc.), for example to create a Merchant Account.

Optionally, the method 200 includes a reverse campaign (e.g., the method 200 includes recommending a reverse campaign strategy, etc.). For example, acquirers can use a reverse campaign to do reach out to buyers. For example, the entire concept of vendor enablement (e.g., as described herein with respect to the methods and systems disclosed herein, etc.) can be reversed and be done as a buyer campaign (e.g., where a list of buyers of a vendor is given, the method includes an AR analysis, and works with multiple banks, etc.). In some examples, an acquirer includes a vendor. In some examples, a reverse campaign enables an acquirer to do reach out (e.g., outreach) to a buyer (e.g., a bank, a card issuer, a customer, a provider, a corporate buyer, etc.). In some examples, reaching out to a buyer via a recommended reverse campaign strategy enables an acquirer to identify (e.g., shop for, etc.) card opportunities (e.g., card providers, card issuers, etc.) for the vendor. In some examples, an acquirer includes a $3^{rd}$ party service provider. In some examples, a reverse campaign enables an acquirer to reach out to a vendor directly.

In some examples, the method 200 includes acquirer lead generation for non-acceptors. For example, the method 200 may include generating a lead comprising an identification of a non-acceptor, for example for use by a corporate (e.g., a bank, a card issuer, a customer, a provider, a corporate buyer, etc.). In some examples, the lead is automatically generated, for example using a machine learning model of the AI engine 106. In some examples, the system 100 can automatically route the merchants for B2B Acceptance to their respective acquirers if they have consumer acceptance so they can cross sell on B2B, if there is none, then the customer will be able to put in criteria based on which the leads will go to the acquirers. In some examples, the same is applicable in reverse where the buyer lead can go in reverse campaigns to Buyers.

As described above, an outcome of a campaign and/or a campaign strategy may be fed into the historical campaign data to improve the AI engine 106, future machine learning models, and/or the like. For example, in some examples, the method 200 leverages historical campaign data to see how a campaign fared previously, what parameters, conditions, and/or the like were successful, etc., and based thereon, the method 200 can tailor recommendations for a new campaign. In some examples, the system 100 automatically tracks an outcome of a recommended campaign strategy, automatically updates the historical campaign data with the outcome of the recommended campaign strategy, and automatically updates the next versions of the system 100 (e.g., of the AI engine 106, of one or more machine learning models, etc.) based on an output of the machine learning model using the updated historical campaign data.

In one example, the method 200 includes updating historical campaign data with an outcome of a campaign, providing the updated historical campaign data as input to a machine learning model trained for the campaign, determining feedback data indicating accuracy of the machine learning model using an output of the machine learning model and the outcome of the campaign, and adjusting at least one parameter of the machine learning model using the determined feedback data, wherein the machine learning model is adjusted to be more accurate at determining campaign performance. The system 100 is configured to refine the accuracy of the machine learning model by iteratively repeating said updating, providing, determining, and adjusting steps over a plurality of campaigns. In some examples, updating the historical campaign data with the outcome of the campaign includes using the machine learning model to automatically feed the outcome into the historical campaign data.

In some examples, the output of the machine learning model includes a likelihood that a vendor will accept a card offer of the campaign, the method 200 includes determining the feedback data indicating accuracy of the machine learning model by comparing, using the machine learning model, the outcome of the campaign to the likelihood that the vendor will accept the card offer of the campaign. In some examples, the method 200 includes determining the feedback data indicating accuracy of the machine learning model by comparing, using the machine learning model, the output of the machine learning model to the outcome of the campaign under at least one condition (e.g., payment acceleration, message strength, etc.).

In some examples, the method 200 includes adjusting the at least one parameter of the machine learning model using the determined feedback data by automatically determining, using the machine learning model, a reason that a vendor did not accept a card offer of the campaign. In some other examples, the reason is manually determined by a human communicating (e.g., with a phone call, by text, by mail, by email, etc.) with the vendor.

Figure 6:
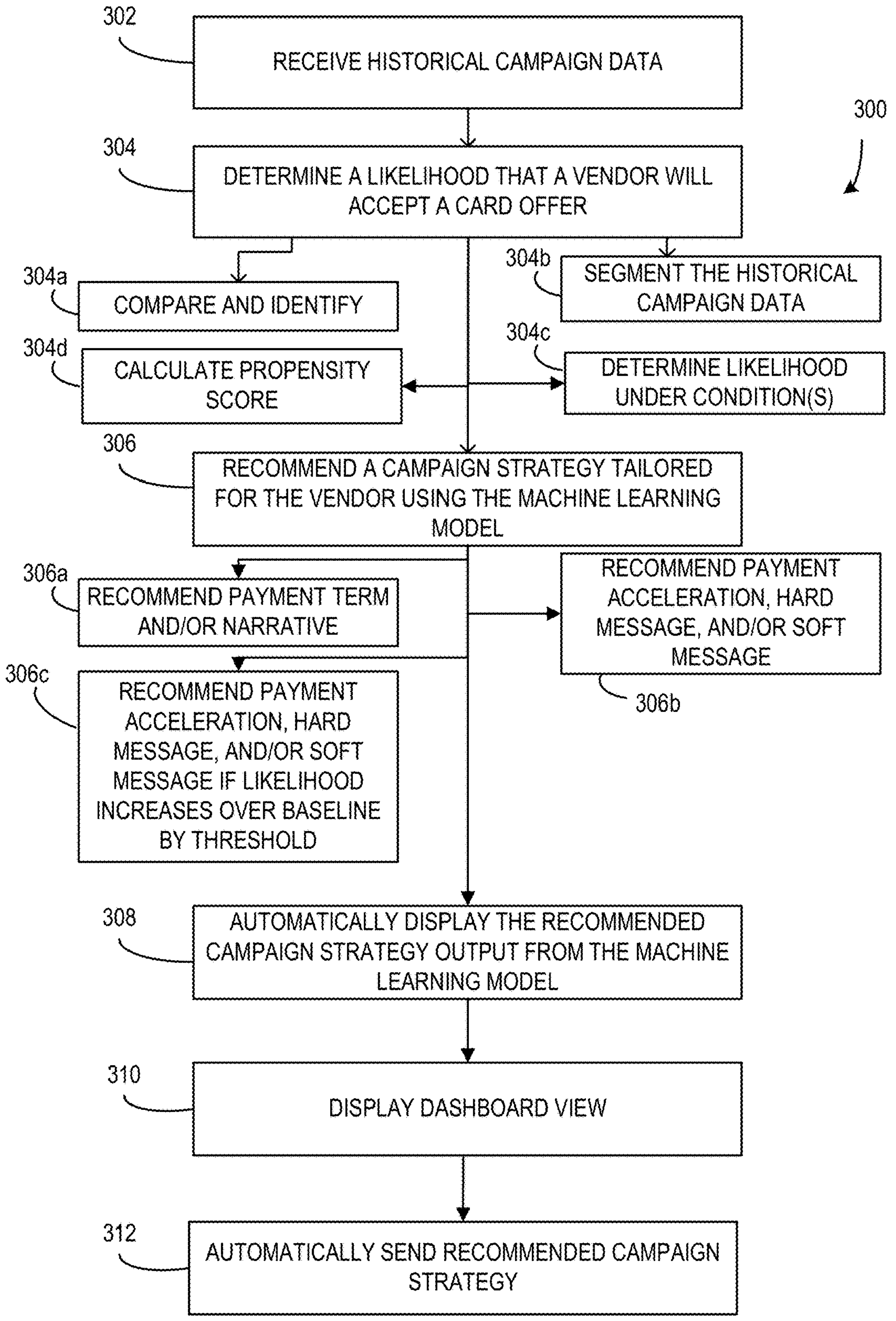
FIG. 6 is a flowchart illustrating an example of a method of the system shown in FIG. 1 according to an implementation.

FIG. 6 is a flowchart illustrating an example of a method 300 of operations, functions, steps, and/or the like of the system 100 (shown in FIG. 1). In some examples, the method 300 is performed using the system 100 including using the AI engine 106 (shown in FIG. 1). For example, in some examples at least one (e.g., one, some, all, etc.) of the steps of the method 300 is at least partially performed by a machine learning model (e.g., the MLM 114 shown in FIG. 1, the MLM 116 shown in FIG. 1, etc.) of the AI engine 106.

At 302, the method 300 includes receiving historical campaign data. At 304, the method 300 includes determining a likelihood that a vendor will accept a card offer by inputting the historical campaign data into a machine learning model that has been trained for at least one campaign using training data including past campaign performance data. In some examples, the past campaign performance data includes an outcome of a past campaign. The method 300 includes, at 306 automatically recommending a campaign strategy tailored for the vendor using the machine learning model. The recommended, at 306, campaign strategy is an output of the machine learning model that is based on the determined likelihood that the vendor will accept the card offer. At 308, the method 300 includes automatically displaying the recommended campaign strategy output from the machine learning model on a GUI (e.g., the GUI 108 shown in FIG. 1, etc.).

In some examples, determining at 304 the likelihood that the vendor will accept the card offer includes, at **304*a***, using the machine learning model to: compare a current campaign with the historical campaign data to define a group of other vendors that share at least one attribute with the vendor; and identify at least one of the other vendors that accepted a past card offer under at least one condition (e.g., payment acceleration, message strength, etc.) using the historical campaign data.

Optionally, determining at 304 the likelihood that the vendor will accept the card offer includes using the machine learning model to segment, at **304*b*, the historical campaign data to define a group of other vendors that share at least one attribute with the vendor. In some examples, determining at 304 the likelihood that the vendor will accept the card offer includes determining, at 304*c***, using the machine learning model, the vendor's likelihood of accepting the card offer under at least one condition including payment acceleration and/or message strength.

Determining at 304 the likelihood that the vendor will accept the card offer includes, in some examples, using the machine learning model to calculate, at **304*d***, a propensity score that is based on a number of other vendors that have accepted a past card offer.

Automatically recommending at 306 the campaign strategy tailored for the vendor includes, in some examples, using the machine learning model to recommend, at **306*a*, a payment term to recommend to the vendor and/or a narrative to convey to the vendor. In some examples, automatically recommending at 306 the campaign strategy tailored for the vendor includes using the machine learning model to recommend, at 306*b*, payment acceleration, a hard message, and/or a soft message if the determined likelihood is above a threshold value. In some examples, automatically recommending at 306 the campaign strategy tailored for the vendor includes using the machine learning model to recommend, at 306*c***, payment acceleration, a hard message, and/or a soft message if the determined likelihood increases over a baseline likelihood by a threshold value.

In some examples, the GUI is a first GUI, and the method 300 further includes displaying, at 310, on a second GUI a dashboard view that illustrates the recommended campaign strategy to the vendor.

The method 300 further includes, in some examples, automatically sending, at 312, the recommended campaign strategy to a card issuer, a $3^{rd}$ party service provider, and/or the vendor.

Figure 7:
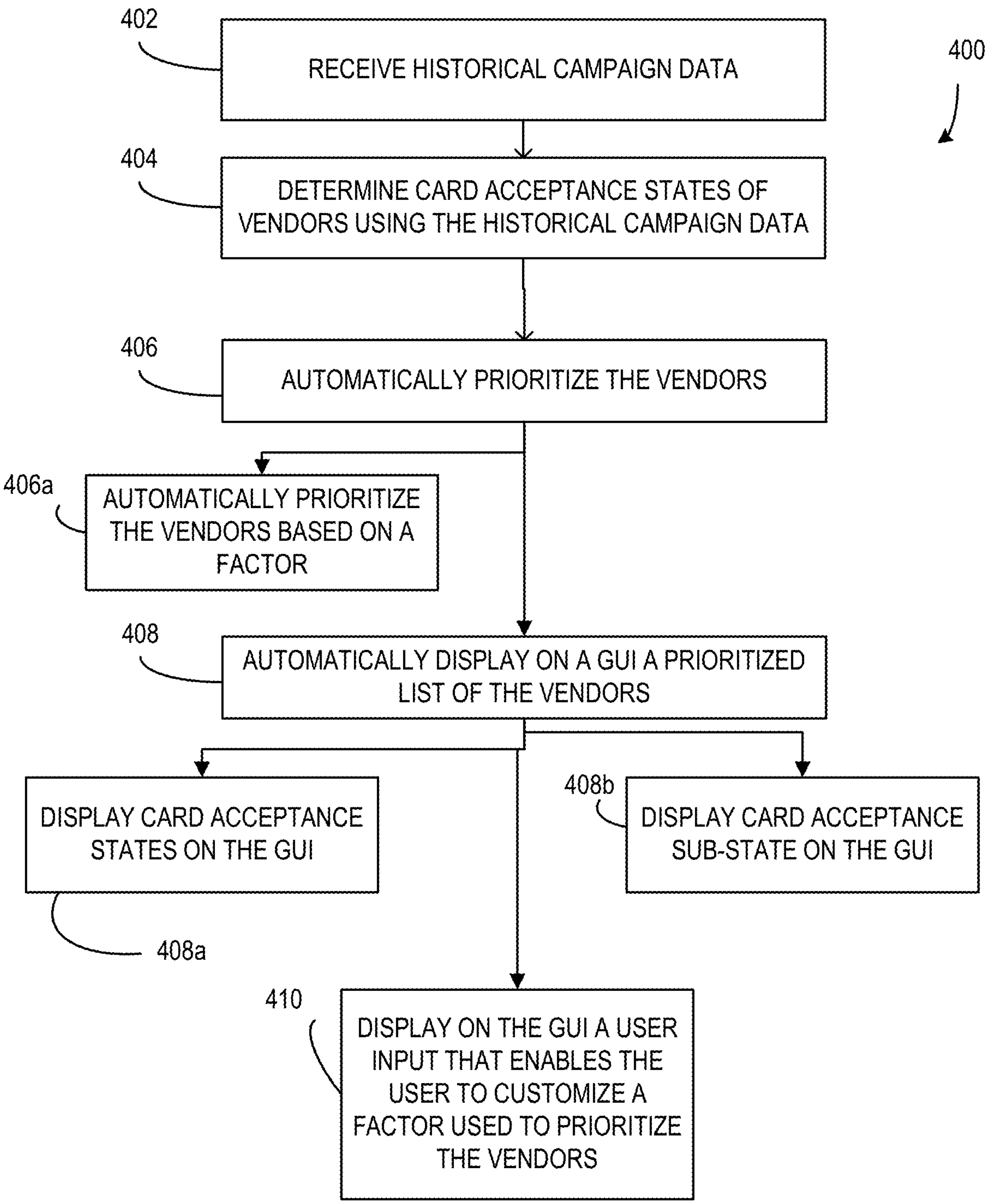
FIG. 7 is a flowchart illustrating an example of a method of the system shown in FIG. 1 according to an implementation.

FIG. 7 is a flowchart illustrating an example of a method 400 of operations, functions, steps, and/or the like of the system 100 (shown in FIG. 1). In some examples, the method 400 is performed using the system 100 including using the AI engine 106 (shown in FIG. 1). For example, in some examples at least one (e.g., one, some, all, etc.) of the steps of the method 400 is at least partially performed by a machine learning model (e.g., the MLM 114 shown in FIG. 1, the MLM 116 shown in FIG. 1, etc.) of the AI engine 106.

At 402, the method 400 includes receiving historical campaign data. At 404, the method includes determining, using a machine learning model that has been trained for a campaign, card acceptance states of vendors using the historical campaign data. The method 400 includes, at 406, automatically, using the machine learning model, prioritizing the vendors based on the historical campaign data and the determined card acceptance states of the vendors. At 408, the method 400 includes automatically displaying, on a GUI (e.g., the GUI 108 shown in FIG. 1, etc.), a prioritized list of the vendors output from the machine learning model.

In some examples, automatically, using the machine learning model, prioritizing at 406 the vendors based on the historical campaign data includes automatically prioritizing, at **406*a***, the vendors based on a factor including a supplier industry, an industry type, an annual spend, an annual transaction volume, a number of annual transactions, an average transaction size, a current payment term, a new payment term, a current payment method, a client type, and/or a vendor-client relationship.

Automatically displaying at 408 the prioritized list of the vendors on the GUI includes, in some examples, displaying, at **408*a***, the card acceptance states on the GUI including displaying a known state of the card acceptance states and/or a potential state of the card acceptance states, wherein the known state indicates that the corresponding vendor has accepted a card payment in the past, and wherein the potential state indicates that the corresponding vendor has not accepted at least a type of card payment in the past.

Optionally, automatically displaying at 408 the prioritized list of the vendors on the GUI includes displaying, at **408*b***, the card acceptance states on the GUI including displaying at least one card acceptance sub-state that indicates a type of card payment that the corresponding vendor has accepted in the past and/or a likelihood that the corresponding vendor will accept a card payment.

In some examples, automatically prioritizing at 406 the vendors and/or automatically displaying at 408 the prioritized list of the vendors on the GUI includes automatically moving text, an icon, and/or the like that represents a vendor to the top of the prioritized list. In some examples, the text, icon, and/or the like that represents the vendor is a link that is selectable on the GUI to link the user to information, data, and/or the like (e.g., historical campaign data, etc.) about the particular vendor. In some examples, automatically prioritizing at 406 the vendors and/or automatically displaying at 408 the prioritized list of the vendors on the GUI includes automatically moving text, an icon, and/or the like that represents a vendor to: a higher position on the prioritized list displayed on the GUI; a lower position on the prioritized list displayed on the GUI; and/or the like.

In some examples, the method 400 further includes displaying, at 410, on the GUI a user input that enables the user to customize a factor used by the machine learning model to prioritize the vendors. In some examples, the factor includes a supplier industry, an industry type, an annual spend, an annual transaction volume, a number of annual transactions, an average transaction size, a current payment term, a new payment term, a current payment method, a client type, and/or a vendor-client relationship.

FIG. 8 illustrates an example of automatically displaying on a GUI (e.g., the GUI 108 shown in FIG. 1, etc.) a prioritized list 270 of the vendors output from the machine learning model. As shown in FIG. 8, the prioritized list displayed on the GUI displays card acceptance states and sub-states (referred to as "acceptance categories" and "acceptance sub-categories", respectively, in FIG. 8) of various vendors.

Referring again to FIG. 3, FIG. 3 illustrates an example of automatically displaying on a GUI (e.g., the GUI 108 shown in FIG. 1, etc.), a user input that enables the user to customize a factor used by the machine learning model to prioritize the vendors. In the exemplary implementation of FIG. 3, the user can select from a list of factors, wherein annual spend is illustrated as a selected example factor.

Figure 10:
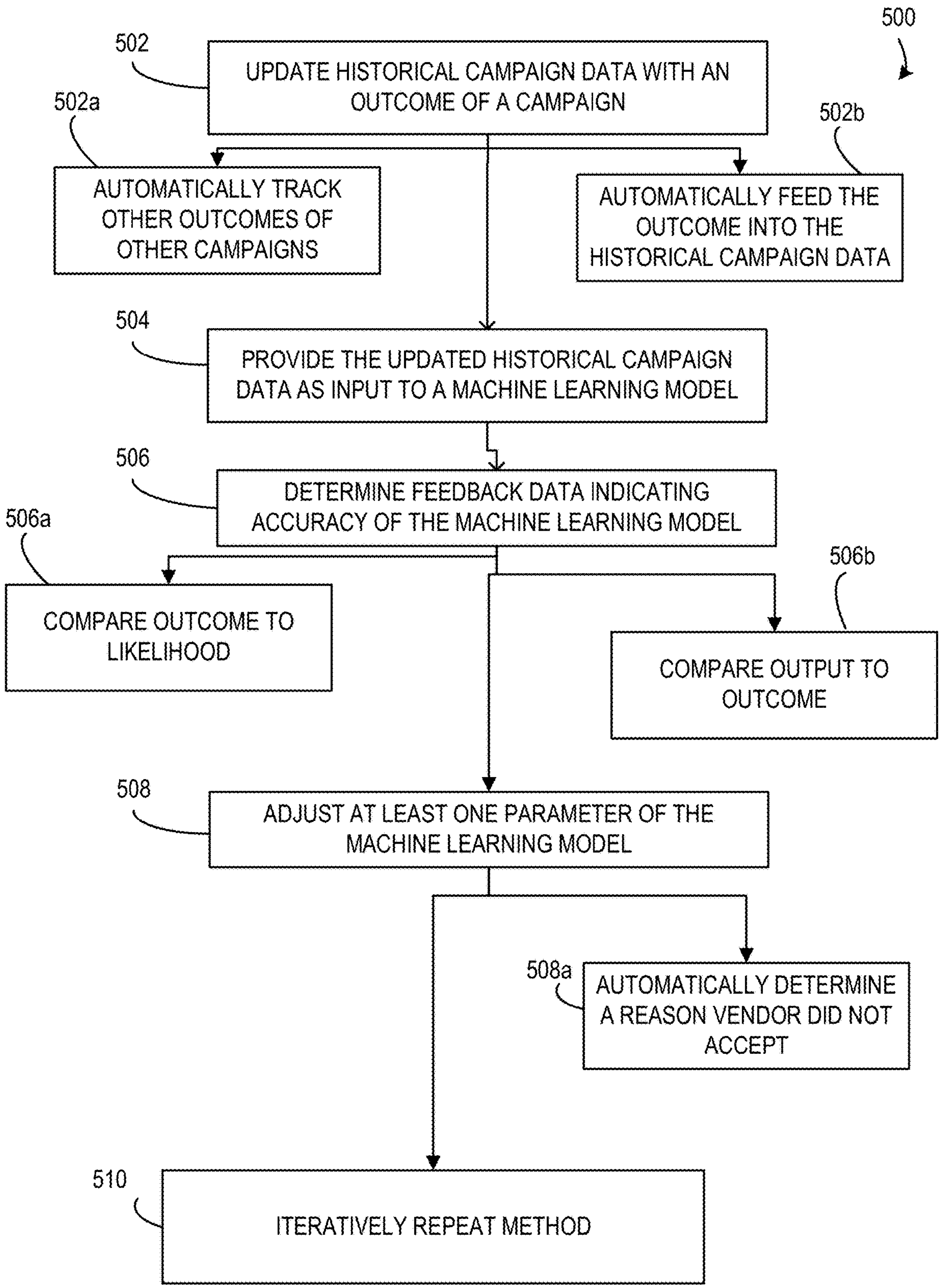
FIG. 10 is a flowchart illustrating an example of a method of the system shown in FIG. 1 according to an implementation.

FIG. 10 is a flowchart illustrating an example of a method 500 of operations, functions, steps, and/or the like of the system 100 (shown in FIG. 1). In some examples, the method 500 is performed using the system 100 including using the AI engine 106 (shown in FIG. 1). For example, in some examples at least one (e.g., one, some, all, etc.) of the steps of the method 500 is at least partially performed by a machine learning model (e.g., the MLM 114 shown in FIG. 1, the MLM 116 shown in FIG. 1, etc.) of the AI engine 106.

At 502, the method 500 includes updating historical campaign data with an outcome of a campaign. The method 500 includes providing, at 504, the updated historical campaign data as input to a machine learning model trained for the campaign. At 506, the method 500 includes determining feedback data indicating accuracy of the machine learning model using an output of the machine learning model and the outcome of the campaign. At 508, the method 500 includes adjusting at least one parameter of the machine learning model using the determined feedback data, wherein the machine learning model is adjusted to be more accurate at determining campaign performance.

In some examples, updating at 502 the historical campaign data with the outcome of the campaign includes using the machine learning model to automatically track, at 502*a*, other outcomes of other campaigns. In some examples, updating at 502 the historical campaign data with the outcome of the campaign includes using the machine learning model to automatically feed, at 502*b*, the outcome into the historical campaign data.

Optionally, the output of the machine learning model includes a likelihood that a vendor will accept a card offer of the campaign, and/or determining at 506 the feedback data indicating accuracy of the machine learning model includes comparing, at 506*a* using the machine learning model, the outcome of the campaign to the likelihood that the vendor will accept the card offer of the campaign.

In some examples, determining at 506 the feedback data indicating accuracy of the machine learning model comprises comparing, at 506*b* using the machine learning model, the output of the machine learning model to the outcome of the campaign under at least one condition (e.g., payment acceleration and/or message strength, etc.).

Adjusting at 508 the at least one parameter of the machine-learning model using the determined feedback data includes, in some examples, automatically determining, at 508*a* using the machine learning model, a reason that a vendor did not accept a card offer of the campaign.

Optionally, the method 500 further includes refining, at 510, the accuracy of the machine learning model by iteratively repeating said updating 502, providing 504, determining 506, and adjusting 508 over a plurality of campaigns.

Exemplary Operating Environment

Figure 11:
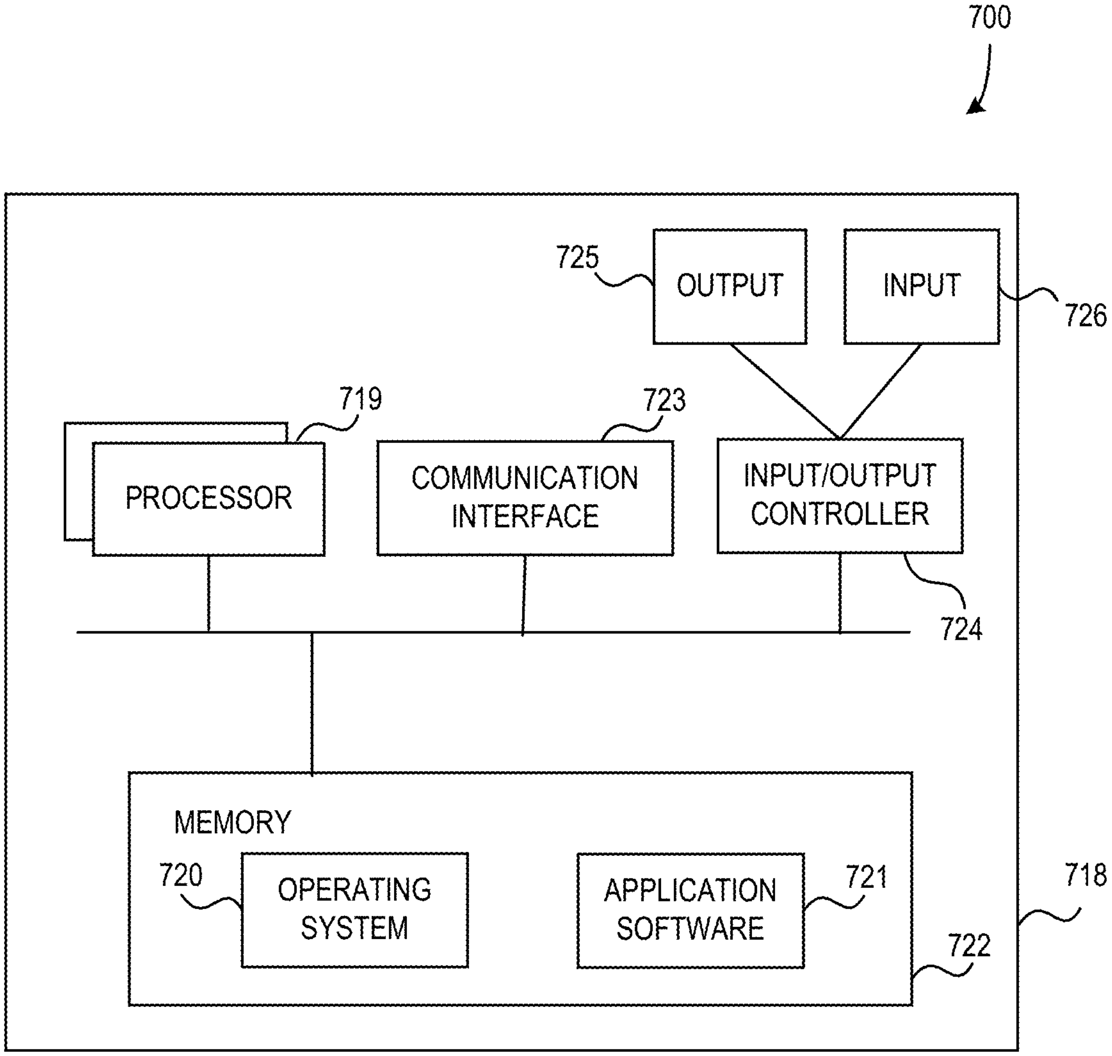
FIG. 11 is a block diagram illustrating an exemplary operating environment according to an implementation. Any of the figures may be combined into a single example or embodiment.

The present disclosure is operable with a computing apparatus according to an embodiment as a functional block diagram 700 in FIG. 11. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device.

In some examples, computer executable instructions are provided using any computer-readable media that is accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium does not include a propagating signal. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display (e.g., displaying a GUI, etc.) or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receives output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

The following clauses describe further aspects:

Clause Set A

A1. A system comprising:
- a processor; and
- a memory comprising computer program code, the memory and the computer program code configured to, with the processor, cause the processor to:
- receive historical campaign data;
- determine a likelihood that a vendor will accept a card offer by inputting the historical campaign data into a machine learning model that has been trained for at least one campaign using training data comprising past campaign performance data;
- automatically recommend a campaign strategy tailored for the vendor using the machine learning model, wherein the recommended campaign strategy is an output of the machine learning model that is based on the determined likelihood that the vendor will accept the card offer; and
- automatically display the recommended campaign strategy output from the machine learning model on a graphical user interface (GUI).

A2. The system of any preceding clause, wherein determining the likelihood that the vendor will accept the card offer comprises using the machine learning model to:
- compare a current campaign with the historical campaign data to define a group of other vendors that share at least one attribute with the vendor; and
- identify at least one of the other vendors that accepted a past card offer under at least one condition using the historical campaign data.

A3. The system of any preceding clause, wherein determining the likelihood that the vendor will accept the card offer comprises using the machine learning model to:
- compare a current campaign with the historical campaign data to define a group of other vendors that share at least one attribute with the vendor; and identify, using the historical campaign data, at least one of the other vendors that accepted a past card offer under at least one condition, wherein the at least one condition comprises at least one of payment acceleration or message strength.

A4. The system of any preceding clause, wherein determining the likelihood that the vendor will accept the card offer comprises using the machine learning model to segment the historical campaign data to define a group of other vendors that share at least one attribute with the vendor.

A5. The system of any preceding clause, wherein determining the likelihood that the vendor will accept the card offer comprises determining, using the machine learning model, the vendor's likelihood of accepting the card offer under at least one condition comprising at least one of payment acceleration or message strength.

A6. The system of any preceding clause, wherein determining the likelihood that the vendor will accept the card offer comprises using the machine learning model to calculate a propensity score that is based on a number of other vendors that have accepted a past card offer.

A7. The system of any preceding clause, wherein automatically recommending the campaign strategy tailored for the vendor comprises using the machine learning model to recommend at least one of a payment term to recommend to the vendor or a narrative to convey to the vendor.

A8. The system of any preceding clause, wherein automatically recommending the campaign strategy tailored for the vendor comprises using the machine learning model to recommend payment acceleration if the determined likelihood is above a threshold value.

A9. The system of any preceding clause, wherein automatically recommending the campaign strategy tailored for the vendor comprises using the machine learning model to recommend a hard message or a soft message if the determined likelihood is above a threshold value.

A10. The system of any preceding clause, wherein automatically recommending the campaign strategy tailored for the vendor comprises using the machine learning model to recommend payment acceleration if the determined likelihood increases over a baseline likelihood by a threshold value.

A11. The system of any preceding clause, wherein automatically recommending the campaign strategy tailored for the vendor comprises using the machine learning model to recommend a hard message or a soft message if the determined likelihood increases over a baseline likelihood by a threshold value.

A12. The system of any preceding clause, wherein the past campaign performance data comprises an outcome of a past campaign.

A13. The system of any preceding clause, wherein the computer program code is further configured to, with the processor, cause the processor to display on the GUI a user input that enables the user to at least one of customize the recommended campaign strategy, customize a parameter of the recommended campaign strategy, or override the recommended campaign strategy.

A14. The system of any preceding clause, wherein the GUI is a first GUI, and the computer program code is further configured to, with the processor, cause the processor to display on a second GUI a dashboard view that illustrates the recommended campaign strategy to the vendor.

A15. The system of any preceding clause, wherein the GUI is a first GUI, and the computer program code is further configured to, with the processor, cause the processor to display on a second GUI an acceptance link that enables the vendor to accept the recommended campaign strategy.

A16. The system of any preceding clause, wherein the computer program code is further configured to cause the processor to use the machine learning model to automatically send the recommended campaign strategy to at least one of a card issuer or a 3rd party service provider.

A17. The system of any preceding clause, wherein the computer program code is further configured to cause the processor to use the machine learning model to automatically send the recommended campaign strategy to the vendor.

A18. The system of any preceding clause, wherein determining the likelihood that the vendor will accept the card offer comprises using the machine learning model to segment the historical campaign data to define a group of other vendors that share at least one attribute with the vendor, wherein the at least one attribute comprises one or more of: a supplier industry, an industry type, an annual spend, an annual transaction volume, a number of annual transactions, an average transaction size, a current payment term, a new payment term, a current payment method, a client type, or a vendor-client relationship.

A19. The system of any preceding clause, wherein the computer program code is further configured to cause the processor to use the machine learning model to display on the GUI one or more of: the historical campaign data, the likelihood that the vendor will accept the card offer, the recommended campaign strategy, the vendor's likelihood of accepting the card offer with or without payment acceleration, the vendor's likelihood of accepting the card offer with soft or hard message strength, the vendor's likelihood of accepting the card offer based on message strength, a propensity score, one or more other vendors that accepted the card offer under a condition of the campaign strategy, one or more other vendors that accepted the card offer under at least one condition.

A20. The system of any preceding clause, wherein the computer program code is further configured to cause the processor to use the machine learning model to display on the GUI one or more of: a conversion rate, a projected conversion, a conversion rate target, a configuration of the campaign strategy, details of at least one of the vendor or other vendors, a priority of vendors for calling efforts, recommended payment strategy across methods and terms, a customized campaign parameter, a projected spend, a projected value to a client of the vendor, a projected rebate, a projected working capital benefit, projected process cost savings, a recommendation of at least one of payment terms to recommend to the vendor or a narrative to convey to the vendor, a group of other vendors that share at least one attribute with the vendor, a supplier industry, an industry type, an annual transaction volume, a number of annual transactions, average transaction size, a current payment term, a payment term, a client type, a vendor-client relationship, an override input, a customization input.

Clause Set B

B1. A system comprising:
a processor; and
a memory comprising computer program code, the memory and the computer program code configured to, with the processor, cause the processor to:
receive historical campaign data;
determine, using a machine learning model that has been trained for a campaign, card acceptance states of vendors using the historical campaign data;
automatically, using the machine learning model, prioritize the vendors based on the historical campaign data and the determined card acceptance states of the vendors; and
automatically display, on a graphical user interface (GUI), a prioritized list of the vendors output from the machine learning model.
B2. The system of any preceding clause, wherein automatically displaying the prioritized list of the vendors on the GUI comprises displaying the card acceptance states on the GUI including displaying at least one of a known state of the card acceptance states or a potential state of the card acceptance states, wherein the known state indicates that the corresponding vendor has accepted a card payment in the past, and wherein the potential state indicates that the corresponding vendor has not accepted at least a type of card payment in the past.
B3. The system of any preceding clause, wherein automatically displaying the prioritized list of the vendors on the GUI comprises displaying the card acceptance states on the GUI including displaying at least one card acceptance sub-state that indicates at least one of a type of card payment that the corresponding vendor has accepted in the past or a likelihood that the corresponding vendor will accept a card payment.
B4. The system of any preceding clause, wherein the memory and computer program are further configured to, with the processor, cause the processor to: display on the GUI a user input that enables the user to customize a factor used by the machine learning model to prioritize the vendors.
B5. The system of any preceding clause, wherein the memory and computer program are further configured to, with the processor, cause the processor to: display on the GUI a user input that enables the user to customize a factor used by the machine learning model to prioritize the vendors, wherein the factor comprises at least one of a supplier industry, an industry type, an annual spend, an annual transaction volume, a number of annual transactions, an average transaction size, a current payment term, a new payment term, a current payment method, a client type, or a vendor-client relationship.
B6. The system of any preceding clause, wherein automatically, using the machine learning model, prioritizing the vendors based on the historical campaign data comprises automatically prioritizing the vendors based on a factor comprising at least one of a supplier industry, an industry type, an annual spend, an annual transaction volume, a number of annual transactions, an average transaction size, a current payment term, a new payment term, a current payment method, a client type, or a vendor-client relationship.

Clause Set C

C1. A system comprising:
a processor; and
a memory comprising computer program code, the memory and the computer program code configured to, with the processor, cause the processor to:
update historical campaign data with an outcome of a campaign;
provide the updated historical campaign data as input to a machine learning model trained for the campaign;
determine feedback data indicating accuracy of the machine learning model using an output of the machine learning model and the outcome of the campaign; and
adjust at least one parameter of the machine learning model using the determined feedback data, wherein the machine learning model is adjusted to be more accurate at determining campaign performance.
C2. The system of any preceding clause, wherein updating the historical campaign data with the outcome of the campaign comprises using the machine learning model to automatically track other outcomes of other campaigns.
C3. The system of any preceding clause, wherein the output of the machine learning model comprises a likelihood that a vendor will accept a card offer of the campaign, wherein determining the feedback data indicating accuracy of the machine learning model comprises comparing, using the machine learning model, the outcome of the campaign to the likelihood that the vendor will accept the card offer of the campaign.
C4. The system of any preceding clause, wherein determining the feedback data indicating accuracy of the machine learning model comprises comparing, using the machine learning model, the output of the machine learning model to the outcome of the campaign under at least one condition.
C5. The system of any preceding clause, wherein determining the feedback data indicating accuracy of the machine learning model comprises comparing, using the machine learning model, the output of the machine learning model to the outcome of the campaign under at least one condition comprising at least one of payment acceleration or message strength.
C6. The system of any preceding clause, wherein adjusting the at least one parameter of the machine learning model using the determined feedback data comprises automatically determining, using the machine learning model, a reason that a vendor did not accept a card offer of the campaign.
C7. The system of any preceding clause, wherein the computer program code is further configured to, with the processor, cause the processor to refine the accuracy of the machine learning model by iteratively repeating said updating, providing, determining, and adjusting over a plurality of campaigns.
C8. The system of any preceding clause, wherein updating the historical campaign data with the outcome of the campaign comprises using the machine learning model to automatically feed the outcome into the historical campaign data.

Clause Set D

D1. A computerized method comprising:
receiving historical campaign data;

segmenting vendors into at least one group that shares at least one attribute;

determining card acceptance states of vendors from the at least one group of vendors using the historical campaign data;

recommending campaign strategies for at least one vendor of the at least one group of vendors using the historical campaign data and the determined card acceptance states;

conducting the recommended campaign strategies; and analyzing outcomes of the recommended campaign strategies.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements. Any of the functions, operations, steps, and/or the like of the systems, methods, and the like disclosed herein are, in some examples, performed automatically by one or more processors, AI engines, models, and/or the like.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation (e.g., different steps, etc.) is within the scope of aspects of the disclosure.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Accordingly, and for example, unless explicitly stated to the contrary, implementations "comprising" or "having" an element or a plurality of elements having a particular property can include additional elements not having that property. Further, references to "one implementation" or "an implementation" are not intended to be interpreted as excluding the existence of additional implementations that also incorporate the recited features. The term "exemplary" is intended to mean "an example of".

When introducing elements of aspects of the application or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one." Accordingly, and for example, as used herein, an element or step recited in the singular and preceded by the word "a" or "an" should be understood as not necessarily excluding the plural of the elements or steps.

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the application without departing from their scope. While the dimensions and types of materials described herein are intended to define the parameters of the various implementations of the application, the implementations are by no means limiting and are example implementations. Many other implementations will be apparent to those of ordinary skill in the art upon reviewing the above description. The scope of the various implementations of the application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various implementations of the application, including the best mode, and also to enable any person of ordinary skill in the art to practice the various implementations of the application, including making and using any devices or systems and performing any incorporated methods. The patentable scope of the various implementations of the application is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a processor; and a memory comprising computer program code, the memory and the computer program code configured to, with the processor, cause the processor to:

receive historical campaign data associated with a plurality of vendors;

segment the plurality of vendors into at least one group of vendors that share at least one attribute;

input the received historical campaign data into an artificial intelligence (AI) tool comprising a convolutional neural network that has been trained using training data that included data of a campaign and a corresponding campaign outcome;

determine a card acceptance state of a vendor from the at least one group of vendors using the historical campaign data;

determine, using the AI tool, a likelihood that the vendor will accept a card offer based on the card acceptance state of the vendor, the likelihood being represented as a propensity score based on a quantity of vendors that accepted past offers relative to a total quantity of vendors in the historical campaign data;

based on the propensity score, automatically recommend, using the AI tool, a campaign strategy tailored for a target vendor, the recommended campaign strategy including a payment acceleration based on the AI tool inferring that the payment acceleration increases the propensity score over a baseline propensity score;

determine feedback data indicating an accuracy of the AI tool by comparing the propensity score to an outcome of the campaign strategy based on offering at least one condition to the target vendor recommended using the AI tool, the at least one condition being at least one of the payment acceleration and a message strength;

update the historical campaign data with the outcome of the campaign strategy;

provide the updated historical campaign data to the convolutional neural network of the AI tool;

based on the determined feedback data, automatically adjust at least one parameter of the convolutional neural network of the AI tool to refine the accuracy of the convolutional neural network of the AI tool by iteratively repeating the updating, the providing, and the adjusting over a plurality of campaigns, adjusting the at least one parameter comprising altering a map of the convolutional neural network;

use the parameter-adjusted convolutional neural network of the AI tool to generate a new campaign strategy recommendation only if a likelihood of success of the new campaign strategy is more than a threshold value; and automatically send the recommended new campaign strategy to the vendor from the at least one group of vendors.

2. The system of claim 1, wherein determining the likelihood that the vendor will accept the card offer comprises using the AI tool to:

compare a current campaign with the historical campaign data to define a group of other vendors that share at least one attribute with the vendor; and identify at least one of the other vendors that accepted a past card offer under the at least one condition using the historical campaign data.

3. The system of claim 1, wherein the recommended campaign strategy including the payment acceleration comprises the recommended campaign strategy including the payment acceleration upon determining that the propensity score increases above a threshold value on including the payment acceleration in the recommended new campaign strategy.

4. The system of claim 1, wherein determining the likelihood that the vendor will accept the card offer comprises determining, using the AI tool, the vendor's likelihood of accepting the card offer under at least one condition comprising at least one of the payment acceleration or the message strength.

5. The system of claim 1, wherein the AI tool includes a first machine learning model used for campaign planning and a second machine learning model used for performance tracking.

6. The system of claim 1, wherein automatically recommending the campaign strategy tailored for the target vendor comprises using the AI tool to recommend at least one of a payment term to recommend to the target vendor or a narrative to convey to the target vendor.

7. The system of claim 1, wherein automatically recommending the campaign strategy tailored for the vendor comprises using the AI tool to recommend at least one of the payment acceleration, a hard message, or a soft message if the determined likelihood is above a threshold value.

8. The system of claim 1, wherein the computer program code is further configured to, with the processor, cause the processor to display on a graphical user interface (GUI) a user input that enables a user to at least one of customize the recommended new campaign strategy, customize a parameter of the recommended new campaign strategy, or override the recommended new campaign strategy.

9. A method for rearranging icons representing vendors, on a graphical user interface (GUI) of a computer system, the method causing at least a processor of the computer system to perform operations comprising:

receiving historical campaign data associated with a plurality of vendors;

segmenting the plurality of vendors into at least one group of vendors that share at least one attribute;

inputting the received historical campaign data into an artificial intelligence (AI) tool comprising a convolutional neural network that has been trained using training data that included data of a campaign and a corresponding campaign outcome;

determining, using the AI tool by applying a map of the convolutional neural network, likelihoods that respective vendors will accept a card offer, wherein each likelihood is represented as a propensity score based on a quantity of vendors that accepted past offers relative to a total quantity of vendors in the historical campaign data;

identifying a set of the vendors that have accepted a past card offer based on the propensity scores and a quantity of factors in the historical campaign data;

based on the propensity scores, automatically recommending, using the AI tool, a campaign strategy tailored for each vendor, the recommended campaign strategy including a payment acceleration based on the AI tool inferring that the payment acceleration increases the propensity score over a baseline propensity score;

determining feedback data indicating an accuracy of the AI tool by comparing the propensity score to an outcome of the campaign strategy based on at least the payment acceleration;

updating the historical campaign data with the outcome of the campaign strategy;

providing the updated historical campaign data to the convolutional neural network of the AI tool;

based on the determined feedback data indicating the accuracy, automatically adjusting at least one parameter of the convolutional neural network of the AI tool to refine the accuracy of the convolutional neural network of the AI tool by iteratively repeating the updating, the providing, and the adjusting over a plurality of campaigns, adjusting the at least one parameter comprising altering the map of the convolutional neural network;

using the parameter-adjusted convolutional neural network of the AI tool to generate a new campaign strategy recommendation only if a likelihood of success of the new campaign strategy is more than a threshold value;

automatically sending the recommended new campaign strategy to the at least one group of vendors;

automatically prioritizing the vendors according to the quantity of factors associated with the set of vendors;

displaying on a graphical user interface (GUI) icons representing the prioritized vendors in a list, the icons organized in the list based on a specific criterion, wherein the specific criterion is a quantity of factors associated with each vendor; and automatically moving an icon representing a vendor to a top of the list based on the quantity of factors associated with the vendor.

10. The method of claim 9, wherein the operations further include: displaying at least one of a known state of card acceptance states or a potential state of the card acceptance states, wherein the known state indicates that a corresponding vendor has accepted a card payment in the past, and wherein the potential state indicates that the corresponding vendor has not accepted at least a type of card payment in the past.

11. The method of claim 10, wherein the operations further include displaying at least one card acceptance sub-state that indicates at least one of a type of card payment that the corresponding vendor has accepted in the past or a likelihood that the corresponding vendor will accept a card payment.

12. The method of claim 9, wherein the: the operations further include displaying on the GUI a user input that enables a user to customize the factors used by the AI tool to prioritize the vendors.

13. The method of claim 9, wherein displaying the prioritized vendors in the list on the GUI includes automatically moving an icon, that represents a vendor to:

a higher position on the list displayed on the GUI or a lower position on the list displayed on the GUI.

14. The method of claim 9, wherein automatically prioritizing the vendors according to the quantity of factors associated with a vendor in the set, comprises automatically prioritizing the vendors based at least on one of a supplier industry, an industry type, an annual spend, an annual transaction volume, a number of annual transactions, an average transaction size, a current payment term, a new payment term, a current payment method, a client type, or a vendor-client relationship.

15. A non-transient computer readable storage medium storing computer program code, that when executed by a processor, cause the processor to:

receive historical campaign data;

input the historical campaign data into an artificial intelligence (AI) tool comprising a convolutional neural network that has been trained using training data that included data of a campaign and a corresponding campaign outcome;

determine, using the AI tool a likelihood that a vendor will accept a card offer by applying a map of the convolutional neural network to determine the likelihood based on the inputted received historical campaign data, the likelihood being represented as a propensity score based on a quantity of vendors that accepted past offers relative to a total quantity of vendors in the historical campaign data;

based on the propensity score, automatically recommend, using the AI tool, a campaign strategy tailored for a target vendor, the recommended campaign strategy including a payment acceleration based on the AI tool inferring that the payment acceleration increases the propensity score over a baseline propensity score;

determine feedback data indicating an accuracy of the AI tool by comparing the propensity score to an outcome of the campaign strategy based on offering at least one condition to the target vendor recommended using the AI tool, the condition being at least one of the payment acceleration and a message strength;

update the historical campaign data with the outcome of the campaign strategy;

provide the updated historical campaign data to the convolutional neural network of the AI tool;

based on the determined feedback data indicating the accuracy, automatically adjust at least one parameter of the convolutional neural network of the AI tool to refine the accuracy of the convolutional neural network of the AI tool by iteratively repeating the updating, the providing, and the adjusting over a plurality of campaigns, adjusting the at least one parameter comprising altering the map of the convolutional neural network;

use the parameter-adjusted convolutional neural network of the AI tool to generate a new campaign strategy recommendation only if a likelihood of success of the new campaign strategy is more than a threshold value; and automatically send the recommended new campaign strategy.

16. The non-transient computer readable storage medium of claim 15, wherein the recommended campaign strategy including the payment acceleration comprises the recommended campaign strategy including the payment acceleration upon determining that the propensity score increases above a threshold value on including the payment acceleration in the recommended new campaign strategy.

17. The non-transient computer readable storage medium of claim 15, wherein the AI tool includes a first machine learning model for campaign planning and a second machine learning model for performance tracking.

18. The non-transient computer readable storage medium of claim 15, wherein determining the accuracy of the AI tool comprises comparing output of the AI tool to the outcome of the campaign under the at least one condition.

19. The non-transient computer readable storage medium of claim 15, wherein adjusting the at least one parameter comprises automatically determining, using the AI tool, a reason that a vendor did not accept a card offer of the campaign.

20. The non-transient computer readable storage medium of claim 15, wherein determining the likelihood that the vendor will accept the card offer comprises using the AI tool to:

compare a current campaign with the historical campaign data to define a group of other vendors that share at least one attribute with the vendor; and identify at least one of the other vendors that accepted a past card offer under the at least one condition using the historical campaign data.

* * * * *